US011634071B2

(12) United States Patent
Ma et al.

(10) Patent No.: US 11,634,071 B2
(45) Date of Patent: Apr. 25, 2023

(54) TRAILER SIDESWIPE AVOIDANCE SYSTEM

(71) Applicant: Ford Global Technologies, LLC, Dearborn, MI (US)

(72) Inventors: Chenhao Ma, Canton, MI (US); Steven Ivanics, Livonia, MI (US); Seyed Armin Raeis Hosseiny, Canton, MI (US); Luke Niewiadomski, Dearborn, MI (US); Bo Bao, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 17/146,888

(22) Filed: Jan. 12, 2021

(65) Prior Publication Data

US 2022/0219604 A1 Jul. 14, 2022

(51) Int. Cl.
*B60Q 9/00* (2006.01)
*B62D 15/02* (2006.01)
*B60K 35/00* (2006.01)

(52) U.S. Cl.
CPC .............. *B60Q 9/008* (2013.01); *B60K 35/00* (2013.01); *B62D 15/029* (2013.01);
(Continued)

(58) Field of Classification Search
CPC .. B60Q 9/008; B60K 35/00; B60K 2370/167; B60K 2370/782; B60K 2370/158;
(Continued)

(56) References Cited

U.S. PATENT DOCUMENTS 9,037,349 B2   5/2015  Trombley et al.
9,308,856 B2   4/2016  Lisseman et al.
(Continued)

FOREIGN PATENT DOCUMENTS

CN   106043297 A   * 10/2016   ............. B60D 1/245
CN   108688665 A   * 10/2018   ............. B60K 35/00
(Continued)

OTHER PUBLICATIONS

Svenson, Alrik L. et al., "Development of a Basic Safety Message for Tractor-Trailers for Vehicle-to-Vehicle Communications," Paper No. 15-0379, www.esv.nhtsa.dot.gov/proceedings, Jun. 2015, 12 pages.

(Continued)

*Primary Examiner* — Chico A Foxx
(74) *Attorney, Agent, or Firm* — Frank Lollo; Price Heneveld LLP

(57) ABSTRACT

A trailer sideswipe avoidance system for a vehicle towing a trailer is disclosed. The trailer sideswipe avoidance system includes a sensor system configured to detect objects in an operating environment of the vehicle. The trailer sideswipe avoidance system may include a controller that processes information received from the sensor system to determine whether the object detected in the operating environment of the vehicle is in the travel path of the towed trailer. A visual display displays a trailer collision alert zone and a trailer collision avoidance zone. The position of the trailer collision avoidance zone on the visual display relative to the position of the trailer collision alert zone on the visual display directionally corresponds with a collision avoidance steering angle of the vehicle relative to a current steering angle of the vehicle when the controller determines that the object is in the travel path of the towed trailer.

11 Claims, 13 Drawing Sheets

(52) U.S. Cl.
CPC .. *B60K 2370/158* (2019.05); *B60K 2370/162* (2019.05); *B60K 2370/167* (2019.05); *B60K 2370/171* (2019.05); *B60K 2370/179* (2019.05); *B60K 2370/782* (2019.05)

(58) Field of Classification Search
CPC ........ B60K 2370/162; B60K 2370/171; B60K 2370/179; B62D 15/029
See application file for complete search history.

(56) References Cited

U.S. PATENT DOCUMENTS

| | | | |
|---|---|---|---|
| 9,511,799 B2 | 12/2016 | Lavoie | |
| 9,527,528 B1 | 12/2016 | Harrison | |
| 9,849,911 B2 | 12/2017 | Lee et al. | |
| 11,407,408 B2 * | 8/2022 | Barth | B60W 30/04 |
| 2010/0262338 A1* | 10/2010 | Alguera | B62D 53/0814 |
| | | | 701/36 |
| 2011/0187518 A1 | 8/2011 | Strumolo et al. | |
| 2014/0218522 A1* | 8/2014 | Lavoie | G08G 1/167 |
| | | | 348/148 |
| 2014/0222288 A1* | 8/2014 | Lavoie | G06F 17/00 |
| | | | 701/99 |
| 2014/0303847 A1* | 10/2014 | Lavoie | B62D 15/0275 |
| | | | 701/41 |
| 2015/0073664 A1* | 3/2015 | Petridis | B60W 30/095 |
| | | | 701/41 |
| 2015/0149040 A1* | 5/2015 | Hueger | B62D 15/0275 |
| | | | 701/41 |
| 2016/0257248 A1 | 9/2016 | Lisseman et al. | |
| 2016/0297432 A1* | 10/2016 | Fletcher | B60D 1/245 |
| 2017/0080928 A1* | 3/2017 | Wasiek | B60W 10/20 |
| 2017/0247054 A1* | 8/2017 | Lee | B62D 13/00 |
| 2017/0297619 A1* | 10/2017 | Lavoie | B62D 15/024 |
| 2017/0363728 A1 | 12/2017 | Prasad et al. | |
| 2019/0064835 A1* | 2/2019 | Hoofard | B60D 1/62 |
| 2020/0086919 A1* | 3/2020 | Riikonen | B62D 15/0265 |
| 2021/0070362 A1 | 3/2021 | Xu et al. | |
| 2021/0206213 A1* | 7/2021 | Matsushita | B60R 11/04 |
| 2021/0291818 A1* | 9/2021 | Barth | G08G 1/166 |

FOREIGN PATENT DOCUMENTS

| | | | | |
|---|---|---|---|---|
| DE | 10065230 A1 * | 7/2002 | ............. | B60D 1/00 |
| JP | 2004224093 A * | 8/2004 | | |
| JP | 2021020518 A * | 2/2021 | | |
| WO | WO-2017040771 A1 * | 3/2017 | ............ | B60W 30/09 |

OTHER PUBLICATIONS

Commonly assigned co-pending U.S. Appl. No. 16/564,351, filed Sep. 9, 2019, including filing receipt, application and drawings.

* cited by examiner

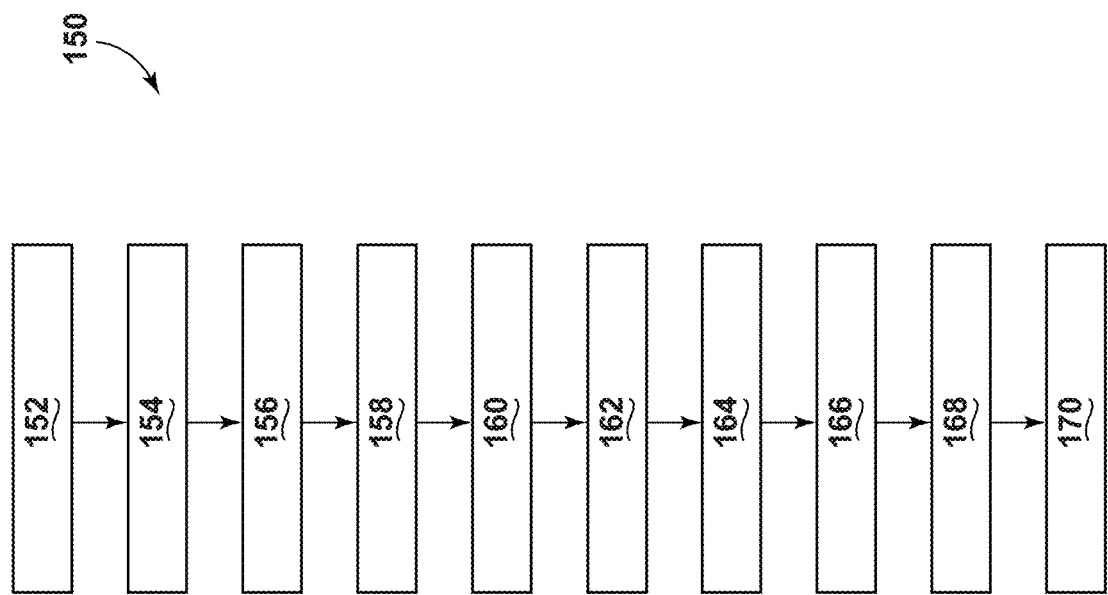

TRAILER SIDESWIPE AVOIDANCE SYSTEM

FIELD OF THE INVENTION

The present invention generally relates to trailer towing, and more particularly relates to a sideswipe detection and avoidance system for vehicles towing trailers.

BACKGROUND OF THE INVENTION

A trailer being towed by a vehicle does not follow the exact path of the vehicle as the vehicle turns. As such, towing a trailer around curves may be challenging for drivers.

SUMMARY OF THE INVENTION

According to a first aspect of the present invention, a trailer sideswipe avoidance system for a vehicle towing a trailer is provided. The trailer sideswipe avoidance system includes a sensor system configured to detect one or more objects in an operating environment of the vehicle. The trailer sideswipe avoidance system also includes a controller that processes information received from the sensor system to determine whether an object detected in the operating environment of the vehicle is in a travel path of the towed trailer as the vehicle turns. The trailer sideswipe avoidance system further includes a visual display that displays a trailer collision alert zone and a trailer collision avoidance zone at respective positions on the visual display. The position of the trailer collision avoidance zone on the visual display relative to the position of the trailer collision alert zone on the visual display directionally corresponds with a collision avoidance steering angle of the vehicle relative to a current steering angle of the vehicle when the controller determines that the object is in the travel path of the towed trailer.

Embodiments of the first aspect of the invention may include any one or a combination of the following features:
- the position of the trailer collision avoidance zone on the visual display relative to the position of the trailer collision alert zone on the visual display directionally corresponds with the current steering angle of the vehicle relative to a collision inducing steering angle of the vehicle when the controller determines that the object is outside of the travel path of the towed trailer;
- the trailer collision alert zone is a different color than the trailer collision avoidance zone;
- the trailer collision avoidance zone includes a first subzone and a second subzone, wherein the second subzone is positioned further than the first subzone from the trailer collision alert zone, and wherein each of the first subzone, the second subzone, and the trailer collision alert zone are different colors;
- the trailer collision avoidance zone and the trailer collision alert zone generally form an arc on the visual display;
- the controller is further configured to prompt the visual display to display a steering indicator that represents a current steering angle of the vehicle, wherein the steering indicator corresponds with the trailer collision alert zone when the controller determines that the object is in the travel path of the towed trailer; and
- the steering indicator corresponds with the trailer collision avoidance zone when the controller determines that the object is outside of the travel path of the towed trailer.

According to a second aspect of the present invention, a trailer sideswipe avoidance system for a vehicle towing a trailer is provided. The trailer sideswipe avoidance system includes a sensor system configured to detect one or more objects in an operating environment of the vehicle. The trailer sideswipe avoidance system also includes a plurality of haptic devices coupled to a steering wheel of the vehicle. The trailer sideswipe avoidance system further includes a controller configured to determine whether an object detected in the operating environment of the vehicle is in a travel path of the towed trailer as the vehicle turns, and prompt the plurality of haptic devices to activate sequentially based on a determination that the object is in the travel path of the towed trailer, such that haptic output travels along the steering wheel in at least one of a clockwise direction and a counter-clockwise direction.

Embodiments of the second aspect of the invention may include any one or a combination of the following features:
- the haptic output travels in the counter-clockwise direction along the steering wheel when a collision avoidance steering angle is achievable via counter-clockwise rotation of the steering wheel;
- the haptic output travels in the clockwise direction along the steering wheel when the collision avoidance steering angle is achievable via clockwise rotation of the steering wheel; and
- the haptic output includes vibration of the steering wheel.

According to a third aspect of the present disclosure, a method of operating a trailer sideswipe avoidance system for a vehicle towing a trailer is provided. The method of operating a trailer sideswipe avoidance system for a vehicle towing a trailer includes the steps of detecting an object in an operating environment of the vehicle, determining the object is in a travel path of the towed trailer, and displaying a trailer collision alert zone and a trailer collision avoidance zone at respective positions on a visual display. The position of the trailer collision avoidance zone on the visual display relative to the position of the trailer collision alert zone on the visual display directionally corresponds with a collision avoidance steering angle of the vehicle relative to a current steering angle of the vehicle.

Embodiments of the third aspect of the invention may include any one or a combination of the following steps and/or features:
- the step of modifying the position of the trailer collision alert zone on the visual display based on information from a sensor system of the vehicle;
- the step of displaying a steering indicator on the visual display, wherein the steering indicator represents the current steering angle of the vehicle;
- the steps of steering the vehicle to achieve the collision avoidance steering angle, and modifying the position of the steering indicator on the visual display from a first position, wherein the steering indicator corresponds with the trailer collision alert zone, to a second position, wherein the steering indicator corresponds with the trailer collision avoidance zone;
- the trailer collision alert zone is a different color than the trailer collision avoidance zone;
- the trailer collision avoidance zone includes a first subzone and a second subzone, wherein the second subzone is positioned further than the first subzone from the trailer collision alert zone, and wherein each of the first subzone, the second subzone, and the trailer collision alert zone are different colors;
- the trailer collision avoidance zone and the trailer collision alert zone generally form an arc on the visual display;

the step of activating a plurality of haptic devices coupled to a steering wheel sequentially, such that haptic output travels along the steering wheel of the vehicle in at least one of a clockwise direction and a counter-clockwise direction; and the haptic output travels in the counter-clockwise direction and the trailer collision avoidance zone is positioned left of the trailer collision alert zone on the visual display.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 13 is a block diagram illustrating a method of operating the trailer sideswipe avoidance system, according to one embodiment.

DETAILED DESCRIPTION OF THE PREFERRED EMBODIMENTS

Figure 1:
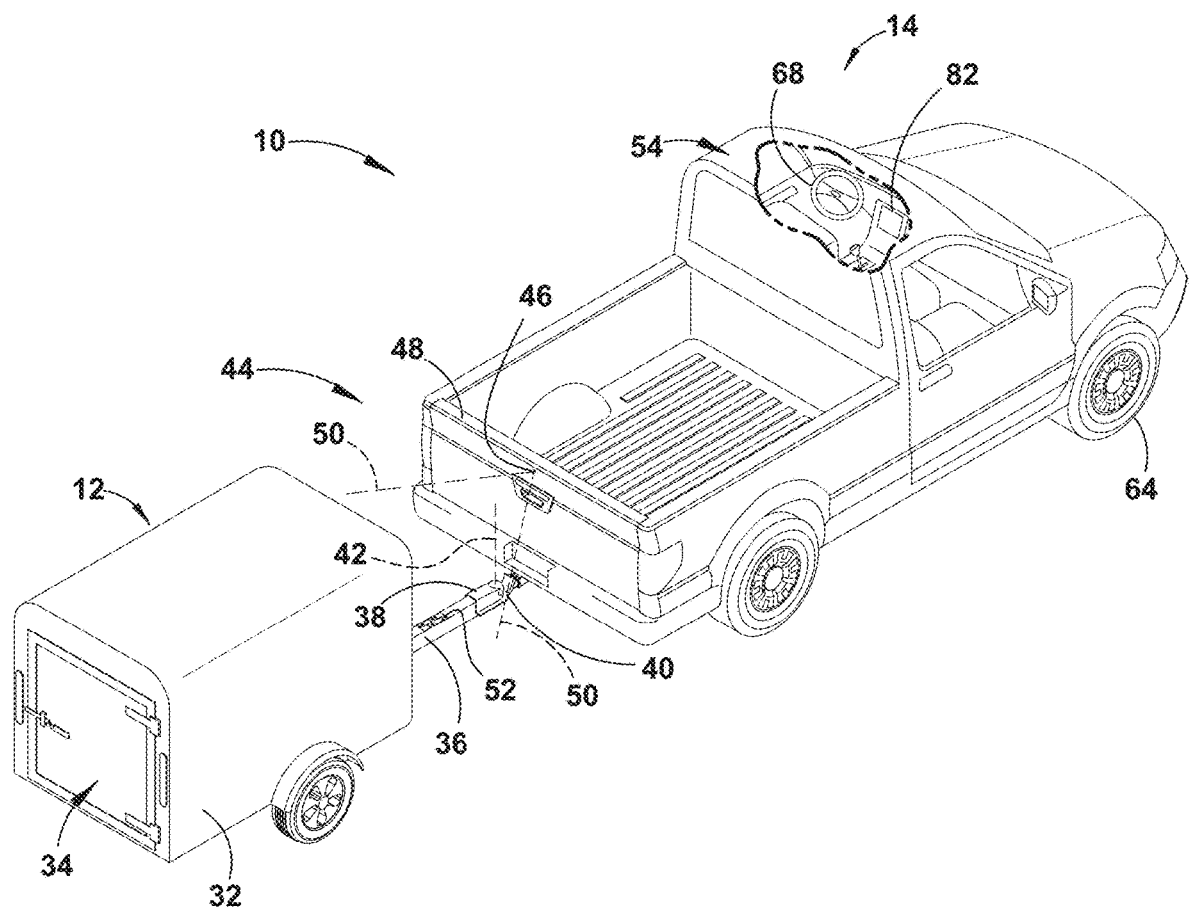
FIG. 1 is a top perspective view of a vehicle attached to a trailer with a hitch angle sensor of a sensor system of the vehicle for operating a trailer sideswipe avoidance system, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-13, a trailer sideswipe avoidance system 10 for a vehicle 14 towing a trailer 12 is disclosed. The trailer sideswipe avoidance system 10 may include a sensor system 16 configured to detect one or more objects 15 in an operating environment 24 of the vehicle 14. The trailer sideswipe avoidance system 10 may include a controller 28 that processes information received from the sensor system 16 to determine whether the object 15 detected in the operating environment 24 of the vehicle 14 is in the travel path of the towed trailer 12. A visual display 82 displays a trailer collision alert zone 204 and a trailer collision avoidance zone 202. The position of the trailer collision avoidance zone 202 on the visual display 82 relative to the position of the trailer collision alert zone 204 on the visual display 82 directionally corresponds with a collision avoidance steering angle of the vehicle 14 relative to a current steering angle δ of the vehicle 14 when the controller 28 determines that the object 15 is in the travel path of the towed trailer 12.

With reference to the embodiment shown in FIG. 1, the vehicle 14 is a pickup truck embodiment that is equipped with one embodiment of the trailer sideswipe avoidance system 10 for monitoring and/or controlling the path of the trailer 12 that is attached to the vehicle 14. Specifically, the vehicle 14 is pivotally attached to one embodiment of the trailer 12 that has a box frame 32 with an enclosed cargo area 34 and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may include more than one axle; may have various shapes and sizes configured for different loads and items, such as a boat trailer or a flatbed trailer; and may alternatively couple with the vehicle 14 to provide a pivoting connection, such as by connecting with a fifth wheel connector.

Figure 2:
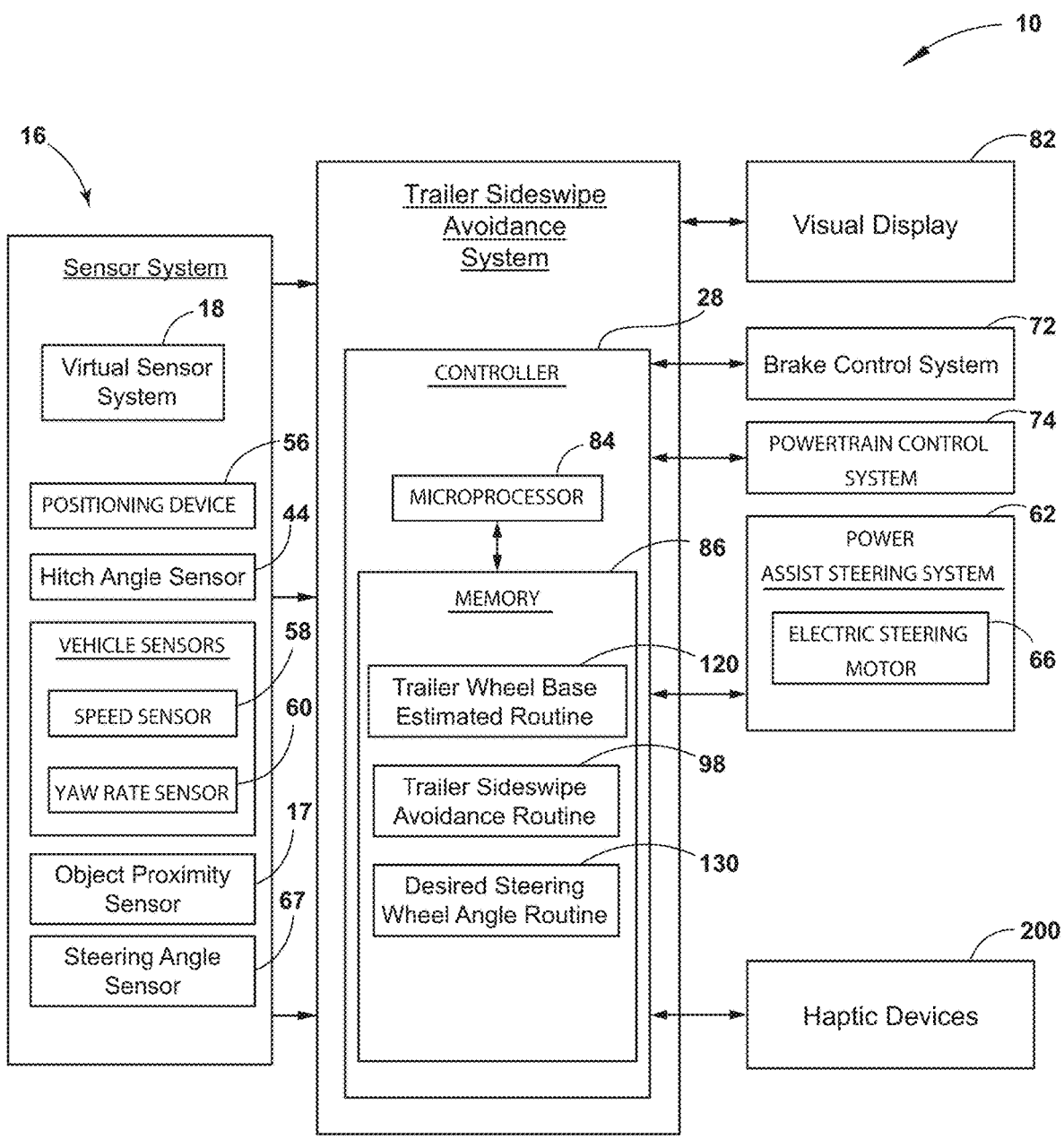
FIG. 2 is a block diagram illustrating the trailer sideswipe avoidance system, having the sensor system, a controller, and various other vehicle systems, according to one embodiment.

Referring now to FIG. 2, the vehicle 14 may include a sensor system 16 having a plurality of sensors configured to detect objects 15 in the operating environment 24 of the vehicle 14 that may be in a potential travel path of the trailer 12. The plurality of sensors may include one or a combination of visual sensors (e.g., cameras, surround view cameras, etc.), radar sensors, Lidar sensors, ultrasonic sensors, lasers, thermal sensors, and/or various other sensors. For example, in some embodiments, the vehicle 14 may include ultrasonic sensors, surround view cameras, radar sensors disposed on the corners and front of the vehicle 14, and a camera on the front of the vehicle 14. It is contemplated that the plurality of sensors in the sensor system 16 may be located in various positions on the vehicle 14. It is further contemplated that, in some embodiments, one or more of the plurality of sensors may be coupled to the trailer 12 in addition to the one or more sensors coupled to the vehicle 14. The sensor system 16 may be configured to provide sensed inputs to the controller 28. In various embodiments, the data collected from the plurality of sensors in the sensor system 16 may be utilized by the controller 28 to map the features detected within the operating environment 24 of the vehicle 14. The features detected within the operating environment 24 of the vehicle 14 may include, but are not limited to, the vehicle 14, the trailer 12, and objects 15, such as moving and stationary objects 15 within a prescribed distance of the vehicle 14 and/or the trailer 12.

Figure 3:
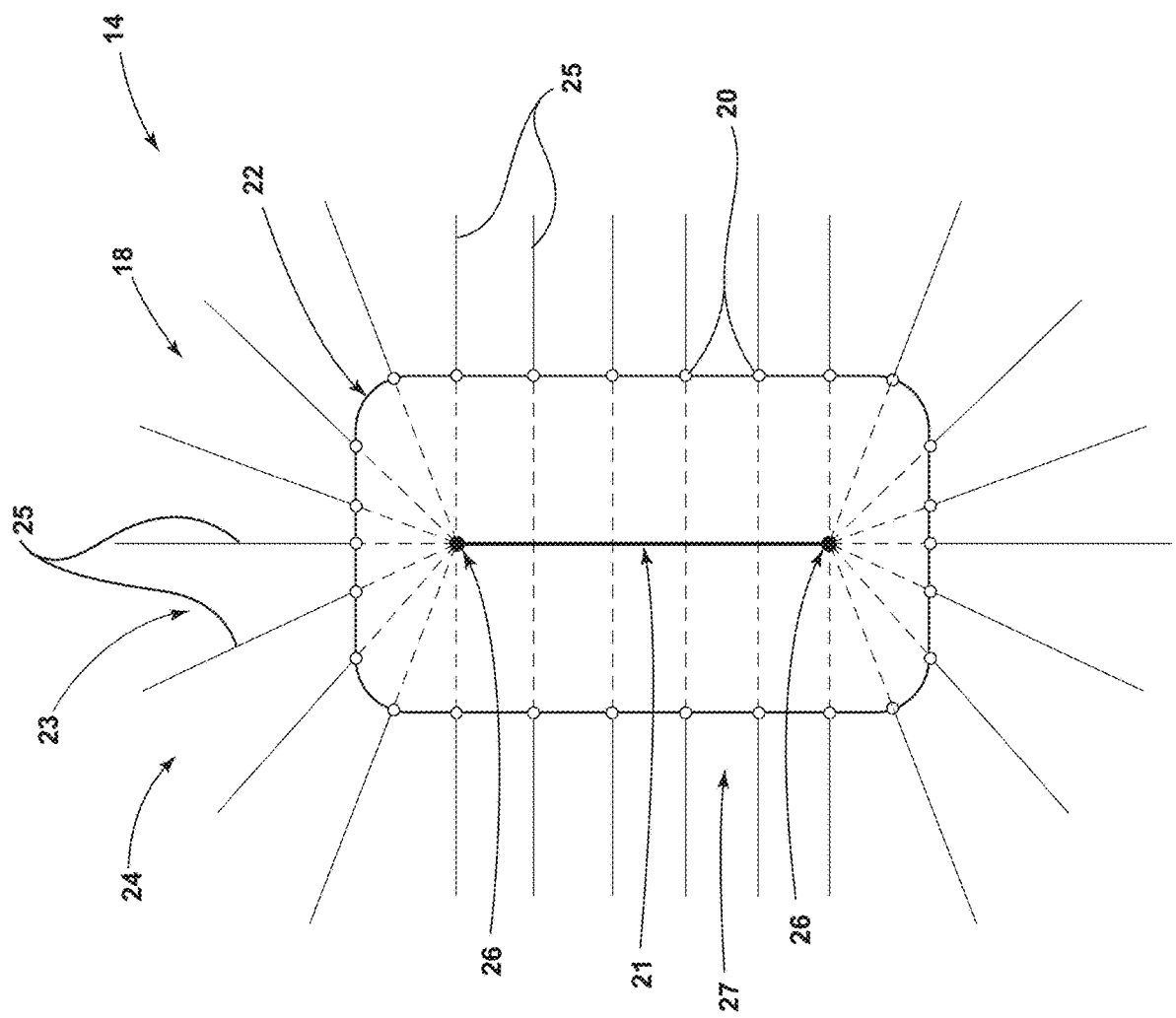
FIG. 3 is a top-down representation of spatial segmentation of an operating environment of the vehicle output by a virtual sensor system, according to one embodiment.

Referring now to FIG. 3, in some embodiments, the data collected from the variety of sensor types (e.g., visual, radar, ultrasonic) may be fused (sensor fusion) to simulate virtual sensors 20 positioned on the vehicle 14. A virtual sensor system 18 that results from the fusion of various sensor inputs may be configured to output a spatial segmentation of the operating environment 24 of the vehicle 14. In some embodiments, the spatial segmentation of the operating environment 24 of the vehicle 14 may be output as a two dimensional representation of the operating environment 24 of the vehicle 14 from a top-down perspective, as shown in FIG. 3. In operation, objects 15 detected by the virtual sensor system 18 within the operating environment 24 of the vehicle 14 may be represented by a distance from the detected object 15 to a delineated vehicle boundary 22. In some embodiments, the detected object 15 may further be represented by the object's 15 determined position within a 2D world coordinate frame of the operating environment 24 of the vehicle 14. In various embodiments, the delineated vehicle boundary 22 may generally trace the contour of the exterior of the vehicle 14 from a top-down perspective, as shown in FIG. 3. However, it is contemplated that the delineated vehicle boundary 22 may deviate from the literal boundary of the vehicle 14 by design.

In various embodiments, the spatial segmentation of the operating environment 24 of the vehicle 14 may include a variety of segment types. For example, as shown in FIGS. 3 and 4A, the spatial segmentation may include point-based segments 23 that are defined by lower and upper boundary vectors 25 originating from a common reference point 26. In various embodiments, the common reference point 26 may be disposed within the delineated vehicle boundary 22, and the upper and lower boundary vectors 25 may extend therefrom across the delineated vehicle boundary 22 into the operating environment 24 surrounding the vehicle 14. However, it is contemplated that the common reference point 26 may be positioned proximate to the delineated vehicle boundary 22. The determined distance of the object 15 detected within the point-based segment 23 from the delineated vehicle boundary 22 may be defined by the Euclidean distance between the nearest detected point of the object 15 and the delineated vehicle boundary 22 along a line 19A between the common reference point 26 and the nearest detected point of the object 15.

Figure 4B:
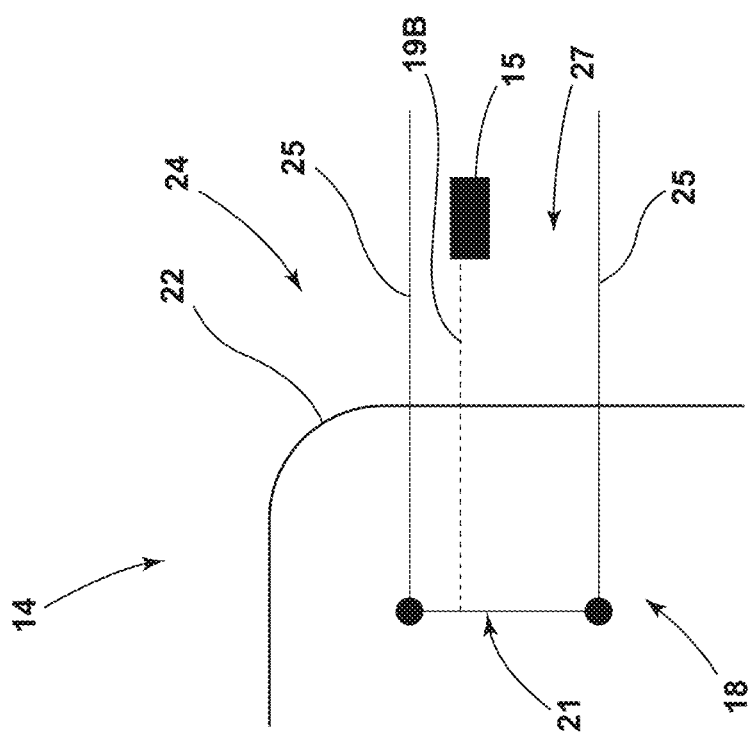
FIG. 4B is a top-down representation of a portion of the spatial segmentation output by the virtual sensor system, illustrating the object between upper and lower boundary vectors of a line-based segment, according to one embodiment.
Figure 4A:
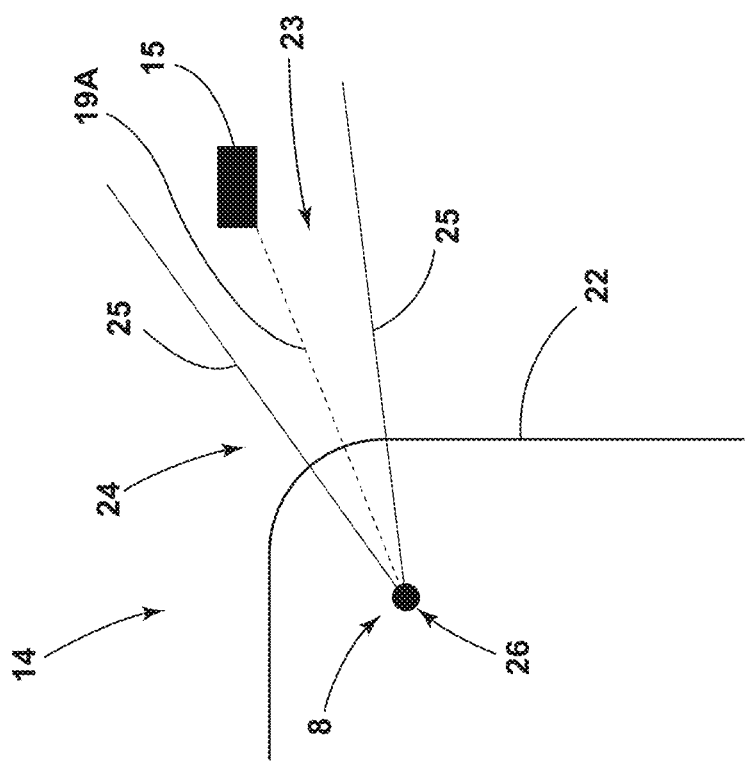
FIG. 4A is a top-down representation of a portion of the spatial segmentation output by the virtual sensor system, illustrating an object between upper and lower boundary vectors of a point-based segment, according to one embodiment.

Referring now to FIGS. 3 and 4B, the spatial segmentation may further include line-based segments 27 that are defined by lower and upper boundary vectors 25 extending from points on a common reference line 21. The determined distance of the object 15 detected within the line-based segment 27 from the delineated vehicle boundary 22 may be defined by the Euclidean distance between the nearest detected point of the object 15 and the delineated vehicle boundary 22 along a line 19B between the nearest point on the common reference line 21 and the nearest detected point of the object 15. It is contemplated that, in various embodiments, the vehicle 14 may include a plurality of common reference points 26 and/or common reference lines 21 from which boundary vectors 25 extend to define respective segments, as may be suitable to tailor the segments of the virtual sensor system 18 to the contours of a given delineated vehicle boundary 22.

In various embodiments, the virtual sensor system 18 may be utilized by the trailer sideswipe avoidance system 10 to identify and characterize objects 15 within the operating environment 24 of the vehicle 14. In particular, the virtual sensor system 18 may provide information to the trailer sideswipe avoidance system 10 regarding trailer width $T_w$, and/or hitch angle γ of the trailer 12 being towed by the vehicle 14, as well as the delineated vehicle boundary 22 of the vehicle 14, and moving or stationary objects 15 within the operating environment 24 of the vehicle 14. With respect to trailer width $T_w$, in some embodiments, the furthest lateral points of the trailer 12 detected by the virtual sensor system 18 may provide a trailer width estimate. In some embodiments, in which the position of the corners of the trailer 12 are determined, trailer width $T_w$ may be defined by the Euclidean distance between the determined corners. Further, in this embodiment, the hitch angle γ may be defined by the angle between the vehicle 14 and a line normal to a vector extending between the determined corner positions of the trailer 12. It is contemplated that the virtual sensor system 18 may determine vehicle 14, trailer 12, and object 15 parameters in addition to those discussed herein, and it is further contemplated that, in some embodiments, the sensor system 16 may determine trailer width $T_w$, hitch angle γ, the position of the vehicle 14, and the position and/or path of objects 15 in the operating environment 24 of the vehicle 14 by means other than the virtual sensor system 18 described herein.

For example, with respect to determining hitch angle γ, in some embodiments, the sensor system 16 may include a vision based hitch angle sensor 44 for sensing the hitch angle γ between the vehicle 14 and the trailer 12, as shown in FIG. 1. In such an embodiment, the hitch angle sensor 44 may employ a camera 46 (e.g., video imaging camera) that may be located proximate an upper region of the vehicle tailgate 48 at the rear of the vehicle 14, such that the camera 46 may be elevated relative to the tongue 36 of the trailer 12. The camera 46 may include an imaging field of view 50 located and oriented to capture one or more images of the trailer 12, including a region containing one or more desired target placement zones for at least one target 52 to be secured. It is contemplated that the camera 46 may capture images of the trailer 12 without a target 52 to determine the hitch angle γ. However, the trailer sideswipe avoidance system 10 may utilize one or more targets 52 placed on the trailer 12 to allow the trailer sideswipe avoidance system 10 to utilize information acquired via image acquisition and processing of the target 52. For instance, the camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, a yaw rate sensor 60 on the trailer 12 and the vehicle 14, energy transducers of a reverse aid system, a blind spot system, and/or a cross traffic alert system, and other conceivable sensors or indicators of the hitch angle γ to supplement or be used in place of the vision based hitch angle sensor 44.

Further, with respect to determining the position of the vehicle 14, in some embodiments, the trailer sideswipe avoidance system 10 may receive vehicle status-related information from additional sensors and devices. This information may include positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the sensed hitch angle γ. The positioning device 56 may additionally or alternatively include a dead reckoning system for determining the coordinate location of the vehicle 14 and the trailer 12 within a localized coordinate system based at least on vehicle speed $v_1$, steering angle δ, and hitch angle γ. Other vehicle information received by the trailer sideswipe avoidance system 10 may include a speed $v_1$ of the vehicle 14 from a speed sensor 58 and a yaw rate $\omega_1$ of the vehicle 14 from the yaw rate sensor 60.

Further still, with respect to detecting potential obstacles, in some embodiments, the sensor system 16 of the trailer sideswipe avoidance system 10 may include an object proximity sensor 17 that provides the proximity of an object 15 to the controller 28 of the trailer sideswipe avoidance system 10. More specifically, the object proximity sensor 17 may provide the trailer sideswipe avoidance system 10 with proximity information of the object 15, which may include information estimating a location of the object or objects 15 relative to the vehicle 14 and/or trailer 12. The object proximity sensor 17 may include an individual sensor, multiple sensors, and various combinations of sensors and sensor systems to capture, generate, and output information characterizing the proximity of the object 15 adjacent to the vehicle 14 and/or trailer 12, as described in more detail herein. Accordingly, the object proximity sensor 17 may include portions of or be incorporated with the hitch angle sensor 44, the positioning device 56, or other additional sensors and devices. The trailer sideswipe avoidance system 10 may use the proximity information of the object or objects 15 as an input to the controller 28 to warn of or avoid a collision with the object or objects 15, as disclosed in greater detail below.

Referring now to FIG. 2, in some embodiments, the trailer sideswipe avoidance system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired path of the trailer 12. In some embodiments, the power assist steering system 62 may be an electric power-assisted steering (EPAS) system that includes an electric steering motor 66 for turning the steered wheels 64 to a steering angle δ based on a steering command, whereby the steering angle δ may be sensed by a steering angle sensor 67 of the power assist steering system 62. The steering command may be provided by the trailer sideswipe avoidance system 10 for autonomously steering or inhibiting manual steering during a potential trailer sideswipe event and may alternatively be provided manually via a rotational position (e.g., steering wheel angle) of a steering wheel 68 (FIG. 1).

Referring further to FIG. 2, the power assist steering system 62 provides the controller 28 of the trailer sideswipe avoidance system 10 with information relating to a rotational position of steered wheels 64 of the vehicle 14, including the steering angle δ. In some embodiments, the controller 28 may process the current steering angle δ, in addition to other vehicle 14 and trailer 12 conditions, to tow the trailer 12 along a desired path. It is conceivable that the trailer sideswipe avoidance system 10, in additional embodiments, may be an integrated component of the power assist steering system 62. For example, the power assist steering system 62 may include a trailer sideswipe warning algorithm for generating vehicle steering information and commands as a function of all or a portion of information received from the sensor system 16, power assist steering system 62, a vehicle brake control system 72, a powertrain control system 74, and/or other vehicle sensors and devices.

In further reference to FIG. 2, the vehicle brake control system 72 may also communicate with the controller 28 to provide the trailer sideswipe avoidance system 10 with braking information, such as vehicle wheel speed, and to receive braking commands from the controller 28. For instance, vehicle speed information can be determined from individual wheel speeds as monitored by the brake control system 72. Vehicle speed $v_1$ may also be determined from the powertrain control system 74, the speed sensor 58, and the positioning device 56, among other conceivable means. In some embodiments, individual wheel speeds can also be used to determine a vehicle yaw rate $\omega_1$, which can be provided to the trailer sideswipe avoidance system 10 in the alternative or in addition to the vehicle yaw rate sensor 60. In certain embodiments, the trailer sideswipe avoidance system 10 can provide vehicle braking information to the brake control system 72 for allowing the trailer sideswipe avoidance system 10 to control braking of the vehicle 14 during towing of the trailer 12. For example, the trailer sideswipe avoidance system 10 in some embodiments may regulate speed of the vehicle 14 while maneuvering the trailer 12 around turns or when objects 15 are detected, which can reduce the potential for sideswipe events, as will be further discussed below.

The powertrain control system 74, as shown in the embodiment illustrated in FIG. 2, may also interact with the trailer sideswipe avoidance system 10 for regulating speed and acceleration of the vehicle 14 during towing of the trailer 12. As mentioned above, regulation of the speed of the vehicle 14 may be necessary to limit the potential for sideswipe events. Similar to high-speed considerations as they relate to risk of a sideswipe event, high acceleration and sharp turns by the driver may also lead to potential sideswipe events.

Figure 8:
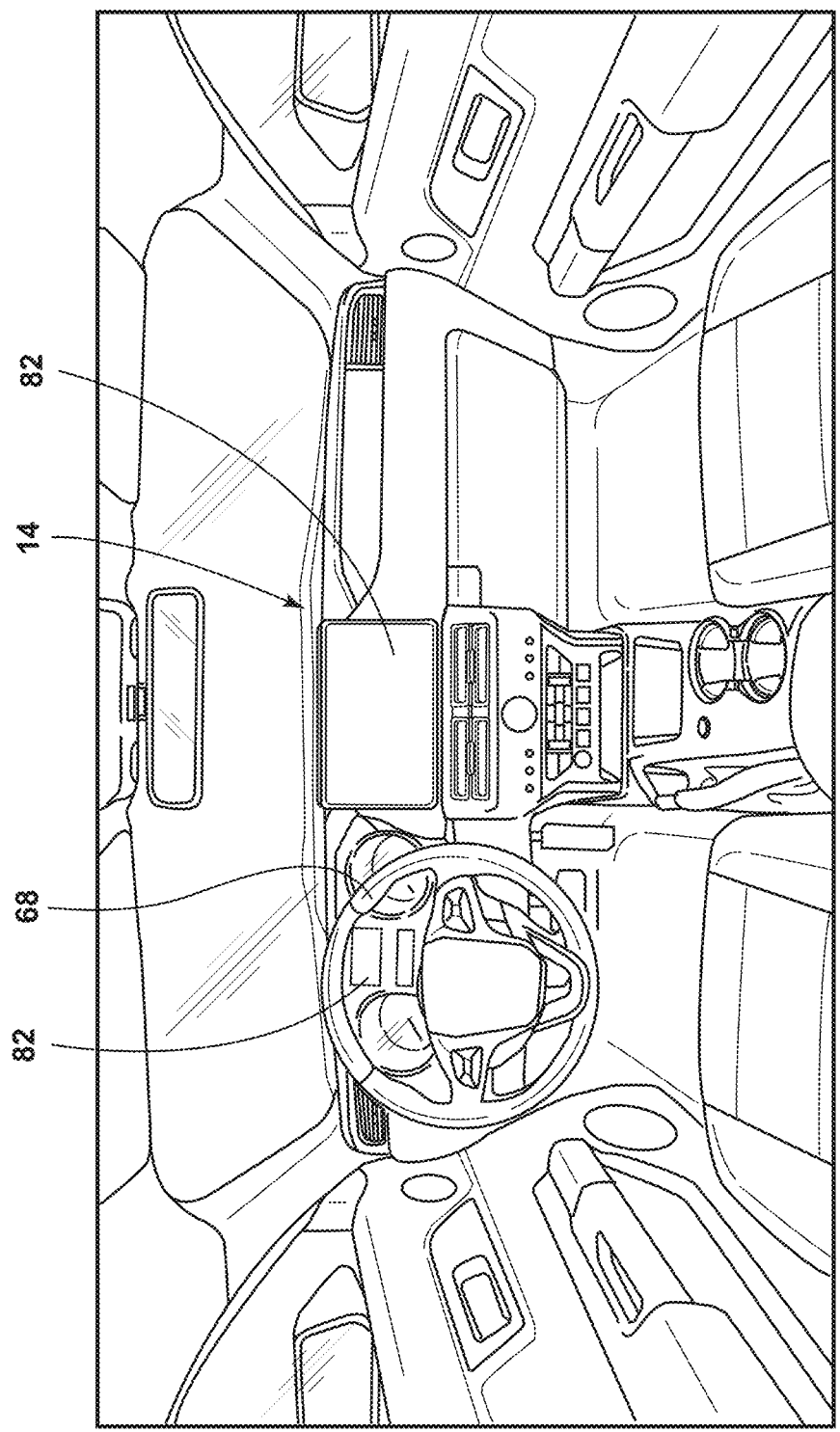
FIG. 8 is a perspective view of a portion of an interior of the vehicle, illustrating a steering wheel and a visual display, according to one embodiment.

With continued reference to FIG. 2, the trailer sideswipe avoidance system 10 in the illustrated embodiment may communicate with one or more devices configured to output visual and/or tactile signals. For example, in various embodiments, the trailer sideswipe avoidance system 10 may be in communication with a visual display 82 configured to output visual signals. The visual display 82 may be a visual display 82 of the vehicle 14. For example, the visual display 82 may be a display screen coupled to a dashboard of the vehicle 14 in front of the steering wheel 68, as illustrated in FIG. 8. In some examples, the visual display 82 of the vehicle 14 may be a center-stack mounted screen, which may function as a touchscreen human machine interface (HMI), as further illustrated in FIG. 8. In some embodiments, the visual display 82 may be a heads-up display (HUD) appearing on a windshield of the vehicle 14. It is contemplated that the visual display 82 may include one or more of a host of types of vehicle displays located in various positions of the vehicle 14. In some implementations, one or more handheld and/or portable devices, such as a smartphone, may include the visual display 82.

Figure 11:
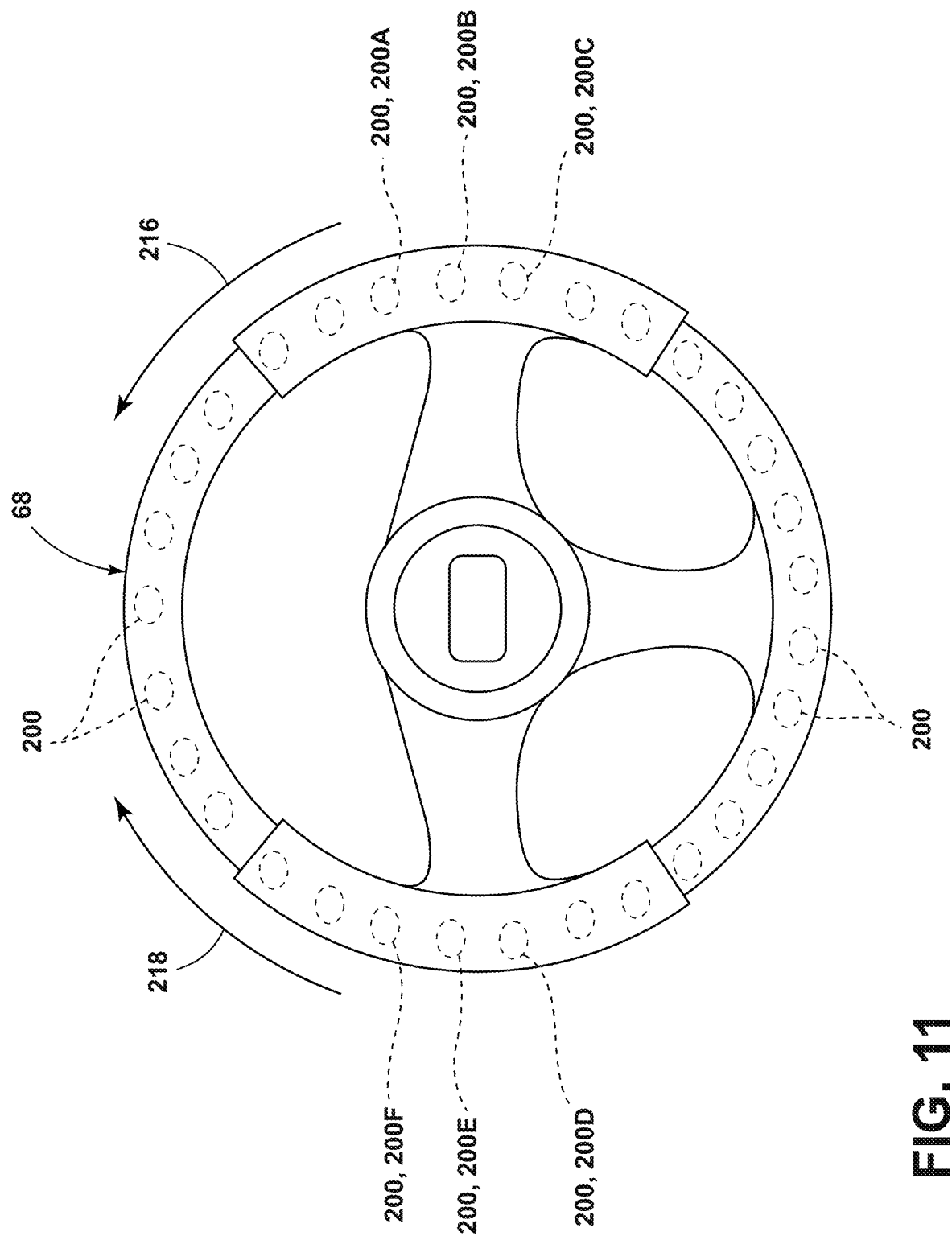
FIG. 11 is a front elevational view of a steering wheel, illustrating a plurality of haptic devices coupled to the steering wheel, according to one embodiment.

Referring now to FIGS. 2 and 11, the trailer sideswipe avoidance system 10 may be in communication with a plurality of haptic devices 200 configured to output tactile signals. The plurality of haptic devices 200 may be coupled to the steering wheel 68. As illustrated in FIG. 11, the plurality of haptic devices 200 may be positioned about the perimeter of the steering wheel 68. The plurality of haptic devices 200 may be configured to produce haptic output via the steering wheel 68 in a variety of forms (e.g., vibrations, pulses, taps, etc.).

As further illustrated in FIG. 2, the controller 28 is configured with a microprocessor 84 to process logic and routines stored in memory 86 that receive information from the sensor system 16, the power assist steering system 62, the vehicle brake control system 72, the trailer braking system, the powertrain control system 74, and other vehicle sensors and devices. The controller 28 may generate warnings, as well as vehicle steering information and commands as a function of all or a portion of the information received. Thereafter, the vehicle steering information and commands may be provided to the power assist steering system 62 for affecting steering of the vehicle 14 to avoid a path of travel leading to a sideswipe event, inhibit manual steering into a path of travel leading to a sideswipe event, and/or modify a path of travel to prevent an imminent sideswipe event of the trailer 12. Additionally, the controller 28 may be configured to prompt one or more vehicle systems to execute one or more sideswipe avoidance measures, as will be discussed in more detail in paragraphs below.

The controller 28 may include the microprocessor 84 and/or other analog and/or digital circuitry for processing one or more routines. Also, the controller 28 may include the memory 86 for storing one or more routines, including a trailer wheel base estimation routine 120, a trailer sideswipe avoidance routine 98, and a desired steering wheel angle routine 130. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 5:
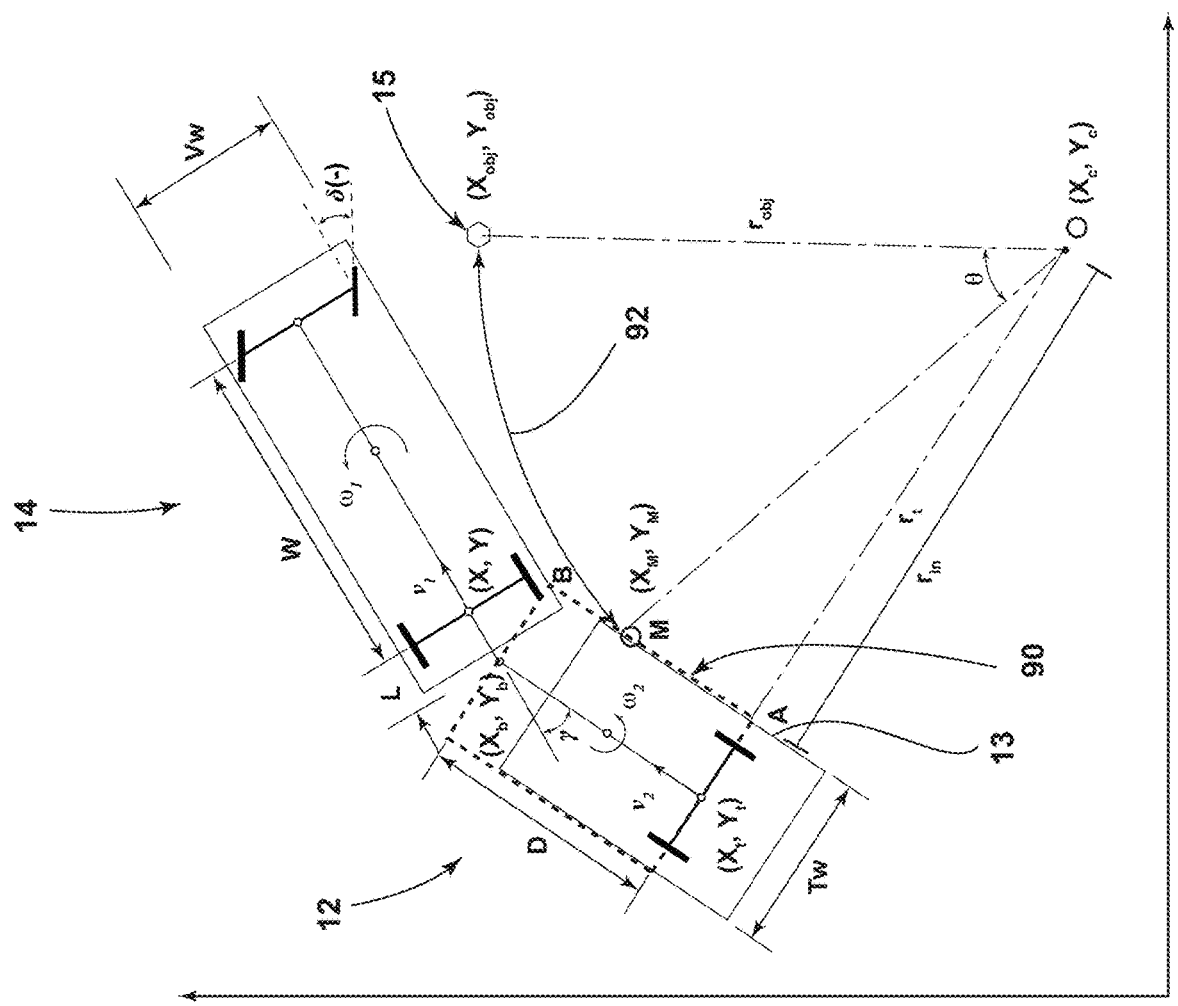
FIG. 5 is a schematic diagram that illustrates the geometry of the vehicle, the trailer, and the object overlaid with a two dimensional x-y coordinate system, identifying variables and parameters used in operation of the trailer sideswipe avoidance system, according to one embodiment.
Figure 6:
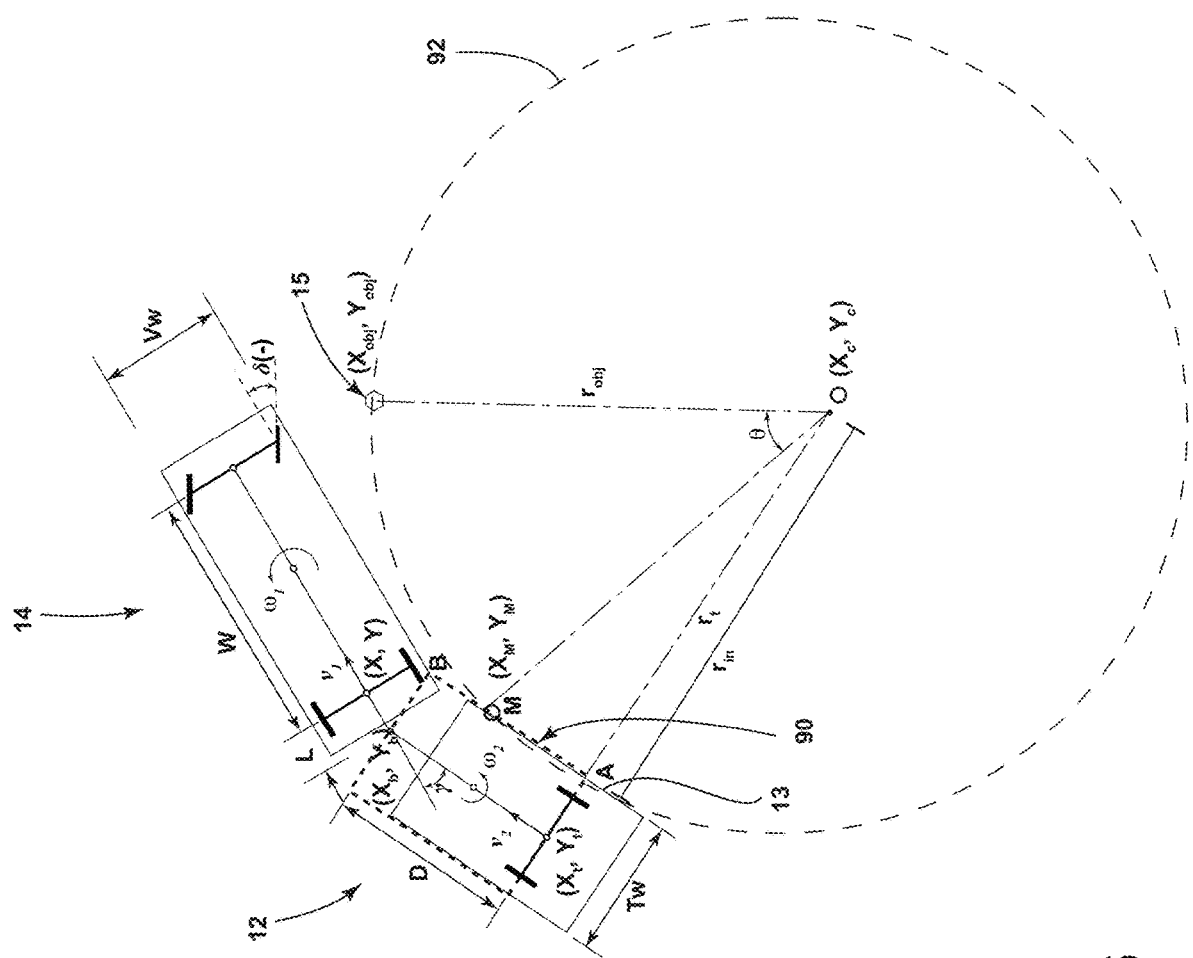
FIG. 6 is a schematic diagram of the geometry of the vehicle, the trailer, and the object, illustrating a virtual circle intersecting an inner trailer boundary line, according to one embodiment.

With reference to FIGS. 5 and 6, we now turn to a discussion of vehicle 14 and trailer 12 information and parameters used to determine a kinematic relationship between the vehicle 14 and the trailer 12 for use in the trailer sideswipe avoidance routine 98. This kinematic relationship may be useful in determining what the travel path of the trailer 12 may be and whether the travel path coincides with objects 15 within the operating environment 24 of the vehicle 14, such that a sideswipe event would result. In describing the kinematic relationship, certain assumptions may be made with regard to parameters associated with the vehicle 14 and/or the trailer 12. Examples of such assumptions include, but are not limited to, the wheels 64 of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 5, for a system defined by the combination of the vehicle 14 and the towed trailer 12, the kinematic relationship is based on various parameters associated with the vehicle 14 and the trailer 12. These parameters may include:

- δ: steering angle at steered front wheels 64 of the vehicle 14;
- α: yaw angle of the vehicle 14;
- β: yaw angle of the trailer 12;
- γ: hitch angle (γ=β−α);
- W: wheel base of the vehicle 14;
- L: length between hitch point and rear axle of the vehicle 14;
- D: trailer wheel base, i.e., distance between hitch point and axle of the trailer 12 or effective axle for a multiple axle trailer 12 (axle length may be an equivalent);
- $r_t$: dynamic turning radius of the trailer 12;
- $V_w$: width of the vehicle 14;
- $T_w$: width of the trailer 12;
- $v_1$: vehicle speed;
- $v_2$: trailer speed;
- $\omega_1$: vehicle yaw rate; and
- $\omega_2$: trailer yaw rate.

It is contemplated that there may be various parameters utilized in determining the kinematic relationship between the vehicle 14 and the trailer 12 that are generally fixed and correspond to the dimensions of the vehicle 14 and trailer 12 combination. Specifically, the trailer wheel base D, the wheel base W of the vehicle 14, and the length L between the hitch point and the rear axle of the vehicle 14 may be generally fixed and may be stored in memory 86, whereas other parameters may be dynamic and obtained from the sensor system 16 on an ongoing basis. It is noted that the wheel base W of the vehicle 14 and the length L between the hitch point and the rear axle of the vehicle 14 relate only to the vehicle 14 itself, within which the controller 28 and, accordingly, memory 86 are installed. It follows, then, that these parameters may be stored in memory 86 during manufacture of vehicle 14, or during installation of the relevant portions of the vehicle 14, as they are known in relation to the specific make and model of the particular vehicle 14.

In some embodiments, an assumption may be made by the trailer sideswipe avoidance system 10 that the length L between the hitch point and the rear axle of the vehicle 14 is equal to zero for purposes of operating the trailer sideswipe avoidance system 10 when a gooseneck trailer or other similar trailer 12 is connected with the hitch ball 40 or a fifth wheel connector located over the rear axle of the vehicle 14. Such an embodiment assumes that the pivoting connection with the trailer 12 is substantially vertically aligned with the rear axle of the vehicle 14. Further, the controller 28 may be configured with modified algorithms to account for this assumption in operation of the trailer sideswipe avoidance system 10. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Contrary to fixed vehicle parameters (e.g., L, W), the trailer wheel base D, while fixed with respect to a given trailer 12 that is coupled to the vehicle 14, may vary as different trailers 12 are hitched to vehicle 14 for towing thereby. Further, the particular trailer 12 with which a given vehicle 14 will be used may not be known during manufacture of vehicle 14, and a user of such vehicle 14 may wish to use the vehicle 14 with various trailers 12 of different sizes and configurations. Accordingly, a routine or other method for the trailer sideswipe avoidance system 10 to obtain the particular trailer wheel base D may be needed and, in some embodiments, may be required for the trailer sideswipe avoidance system 10 to operate.

In some embodiments, vehicle 14 may include various features to facilitate the accurate measuring of the trailer wheel base D by a user. In particular, such features may provide a mechanism to allow flexibility for the user in measuring trailer wheel base D with a reduced risk of error and a streamlined process for inputting the measured value for the trailer wheel base D without manual numeric input using the HMI or the like. In a particular aspect, an encoder similar to an electronic tape measure device may be mounted on the rear of vehicle 14. The encoder may include a string, wire, tape, or similar structure that can be extended outwardly from vehicle 14 by a user until it extends to the first axle of the trailer 12 installed with vehicle 14. The module would automatically read the distance by which the measuring structure is extended from the module, either by reading a series of visible, physical, or magnetic markings along the measuring structure, or using a potentiometer operably coupled with a reel on which the measuring structure is stored. The module can be electrically coupled with controller 28 or the like such that controller 28 can store the measured trailer wheel base D in memory 86 (which, in an example, can correspond to a maximum length of withdrawn measuring structure prior to release by the user and withdrawing thereof by the module). In one example, controller 28 can be restricted in storing such a measurement to when a "calibration mode" has been entered, such as by a user, when a new trailer 12 has been installed with the vehicle 14.

In some embodiments, a short-range radar module may be included in the sensor system 16 of the vehicle 14. Such short-range radar may be electrically coupled with and used by controller 28 to locate one or more "corner cubes" that can be strategically placed on trailer 12 in relation to (e.g., directly above) the front axle thereof. Corner cubes are generally known and are accepted as reliable reflectors of radar and can be used reliably for distance measurements. In an example, corner cubes with magnetic bases can be provided with vehicle 14 for mounting on the particular trailer 12 installed with vehicle 14 at a given time. Further, by using a triangulation method, two corner cubes placed on opposite sides of trailer 12 may also be used to determine the hitch angle γ.

In some embodiments, controller 28 may implement a trailer wheel base estimation routine 120 as-needed to determine the trailer wheel base D within a desired degree of accuracy. In particular, the trailer wheel base estimation routine 120 may utilize an estimate of hitch angle γ determined by the trailer sideswipe avoidance system 10 to derive an estimate for trailer wheel base D. A number of trailer wheel base estimates, taken at regular time intervals over one or more identified periods in which conditions allow for such estimates, can be averaged or filtered to produce a final weighted estimate of trailer wheel base D. Such routines may be generally known in the art.

By utilizing these parameters as well as the other parameters listed above for a variety of calculations, the kinematic relationship between the vehicle 14 and the trailer 12 can be deduced, and whether the towed trailer 12 may sideswipe the object 15 detected in the operating environment 24 of the vehicle 14 may be determined, as described below.

Initially, a position of the hitch ball 40 ($x_b$, $y_b$) may be determined based on the position of the vehicle 14 (x, y), the vehicle yaw angle α, and the length L between the hitch point and rear axle of the vehicle 14. This hitch ball 40 location ($x_b$, $y_b$) is given by the following equations:

$$x_b = x - L \cos \alpha$$

$$y_b = y - L \sin \alpha$$

In various embodiments, the position of the vehicle 14 (x, y) may be represented by a point where a line running along a rear axle of the vehicle 14 intersects a longitudinal centerline of the vehicle 14, as shown in FIGS. 5 and 6.

The trailer yaw angle β may be determined by utilizing the above-mentioned vehicle yaw angle α and the determined hitch angle γ, via the following equation:

$$\beta = \gamma + \alpha$$

The trailer yaw rate $\omega_2$ may be determined with the hitch angle γ, the trailer wheel base D, the vehicle speed $v_1$, and the vehicle yaw rate $\omega_1$, via the following equation:

$$\omega_2 = -\frac{v_1}{D} \sin \gamma - \frac{L}{D} \cos \gamma \, \omega_1$$

The trailer speed $v_2$ may be determined with the length L between the hitch point and the rear axle of the vehicle 14, the vehicle yaw rate $\omega_1$, the vehicle speed $v_1$, and the hitch angle γ, via the following equation:

$$v_2 = v_1 \cos \gamma - L \sin \gamma \omega_1$$

Next, the dynamic trailer turning radius $r_t$ may be determined by dividing the determined trailer speed $v_2$ by the trailer yaw rate $\omega_2$:

$$r_t = \frac{v_2}{\omega_2}$$

For the purposes of operating the trailer sideswipe avoidance system 10, the dynamic trailer turning radius $r_t$ may be limited to maximum value $R_{max}$ such that:

$$-R_{max} \leq r_t \leq R_{max}$$

The position of the trailer ($x_t$, $y_t$) may be determined by using the hitch ball 40 location calculated above ($x_b$, $y_b$), the trailer wheel base D, and the trailer yaw angle β, via the following equations:

$$x_t = x_b - D \cos \beta$$

$$y_t = y_b - D \sin \beta$$

Next, the coordinates of the trailer turning center O ($x_c$, $y_c$) may be determined with the determined position of the trailer ($x_t$, $y_t$), the dynamic trailer turning radius $r_t$, and the trailer yaw angle β, via the following equations:

$$x_c = x_t - r_t \sin \beta$$

$$y_c = y_t + r_t \cos \beta$$

Having calculated the trailer turning center O, the distance $r_{obj}$ of an object 15 from the trailer turning center O may be determined with the steering angle δ at the steered front wheels 64 of the vehicle 14, the coordinates of the trailer turning center O ($x_c$, $y_c$), and the position of the object 15 ($x_{obj}$, $y_{obj}$), via the following equation:

$$r_{obj} = \text{sign}(\delta) \sqrt{(x_c - x_{obj})^2 + (y_c - y_{obj})^2}$$

As discussed above, the position of the object 15 ($x_{obj}$, $y_{obj}$) may be determined by the virtual sensor system 18 or through the use of a variety of other sensors and devices contemplated within the sensor system 16 of the present disclosure. Further, as discussed above, the steering angle δ may be based on data collected from the steering angle sensor 67.

Next, the trailer sideswipe avoidance system 10 may determine whether the detected object 15 is in the travel path of the trailer 12 relative to the trailer turning center O. Referring now to FIG. 6, the sideswipe avoidance system 10 may utilize an inner trailer boundary line 90 extending between point A and point B, where point A is an intersection between an inner side 13 of the trailer 12 and a line extending outward along the axis of a trailer axle, and point B is a point displaced from point A a distance equal to the length of trailer wheel base D in the trailer forward direction substantially parallel to a longitudinal centerline of the trailer 12. The inner side 13 of the trailer 12 may be the side of the trailer 12 that is generally facing the trailer turning center O. Accordingly, the inner side 13 of the trailer 12 may correspond with the turning direction of the vehicle 14. For example, the inner side 13 of the trailer 12 may be the left side of the trailer 12 when the vehicle 14 is turning left, while the inner side 13 of the trailer 12 may be the right side of the trailer 12 when the vehicle 14 is turning right, as illustrated in FIG. 6. The location of point A ($x_A$, $y_A$) may be determined with the position of the trailer ($x_t$, $y_t$), the trailer yaw rate $\omega_2$, the trailer width $T_w$, and the trailer yaw angle β, via the following equations:

$$x_A = x_t - \text{sign}(\omega_2) \frac{Tw}{2} \sin \beta$$

$$y_A = y_t + \text{sign}(\omega_2) \frac{Tw}{2} \cos \beta$$

The location of point B ($x_B$, $y_B$) may be determined with the position of the trailer ($x_t$, $y_t$), the trailer yaw rate $\omega_2$, the trailer width $T_w$, the trailer yaw angle β, and the trailer wheel base D, via the following equations:

$$x_B = x_t + D \cos \beta - \text{sign}(\omega_2) \frac{Tw}{2} \sin \beta$$

$$y_B = y_t + D \cos \beta + \text{sign}(\omega_2) \frac{Tw}{2} \cos \beta$$

Referring further to FIG. 6, having determined the coordinates of point A and point B, the trailer sideswipe avoidance system 10 next determines whether the inner trailer boundary line 90 extending between point A and point B intersects a virtual circle 92 having a radius of $r_{obj}$ (the distance of the detected object 15 from the trailer turning center O) and a center ($x_c$, $y_c$) (the coordinates of the trailer turning center O). If the inner trailer boundary line 90 is found to intersect the virtual circle 92, the trailer sideswipe avoidance system 10 determines that the object 15 is in the travel path of the trailer 12, such that a sideswipe event may occur.

When the trailer sideswipe avoidance system 10 determines that the inner trailer boundary line 90 intersects the virtual circle 92, such that the object 15 is in the travel path of the trailer 12, the trailer sideswipe avoidance system 10 may further determine the intersection point M ($x_M$, $y_M$) of the inner trailer boundary line 90 and the virtual circle 92. The intersection point M ($x_M$, $y_M$) may be determined with the following:

Defining $$d_x = x_B - x_A$$
$$d_y = y_B - y_A$$
$$d_r = \sqrt{d_x^2 + d_y^2}$$
$$Q = \begin{vmatrix} xA & xB \\ yA & yB \end{vmatrix} = x_A y_B - x_B y_A$$

gives the intersection point M ($x_M$, $y_M$)

$$x_M = \frac{Qd_y \pm \text{sgn}*(d_y)d_x\sqrt{r_{obj}^2 d_r^2 - Q^2}}{d_r^2}$$

$$y_M = \frac{-Qd_x \pm |d_y|\sqrt{r_{obj}^2 d_r^2 - Q^2}}{d_r^2}$$

Where the function sgn*(x) is defined as $$\text{sgn}^*(x) = \begin{cases} -1 & \text{for } x < 0 \\ 1 & \text{otherwise.} \end{cases}$$

With the calculated intersection point M ($x_M$, $y_M$) the angle θ between lines running from the trailer turning center O ($x_c$, $y_c$) to the intersection point M ($x_M$, $y_M$) and the trailer turning center O ($x_c$, $y_c$) to the position of the object 15 ($x_{obj}$, $y_{obj}$) may be determined using the law of cosines. The angle θ may then be used in conjunction with the dynamic trailer turning radius $r_t$ and the trailer speed $v_2$ to determine the time until sideswiping $t_{ss}$ of the object 15 with the trailer 12, via the following equation:

$$t_{ss} = \frac{\theta r_t}{v_2}$$

Referring back to FIG. 2, in various embodiments, the controller 28 of the trailer sideswipe avoidance system 10 may prompt one or more vehicle systems to execute a sideswipe avoidance measure when the object 15 is determined to be in the travel path of the trailer 12. In some embodiments, the controller 28 may prompt the power assist steering system 62 to reduce the manual steering torque assist when the object 15 is determined to be in the travel path of the trailer 12. For example, in some embodiments, when the object 15 is determined to be in the travel path of the vehicle 14 as the vehicle 14 is turning to the right, the power assist steering system 62 may reduce the manual steering torque assist provided for steering actions by the driver that would further turn the vehicle 14 to the right. As such, the power assist steering system 62 may be configured to inhibit manual steering by a driver that would result in a sideswipe event happening more quickly or more severely. It is contemplated that, in some embodiments, the controller 28 may prompt the power assist steering system 62 to reduce the manual steering torque assist supplied when the object 15 is not in the travel path of the trailer 12. For example, the controller 28 may prompt the power assist steering system 62 to reduce the manual steering torque assist supplied when over-steering the vehicle 14 would result in the travel path of the vehicle 14 intersecting with the object 15. In this way, a sideswipe avoidance measure may be employed preemptively to ensure that the trailer 12 does not collide with the object 15. It is contemplated that, in some embodiments, the manual steering torque assist of the power assist steering system 62 may be utilized affirmatively to prevent the driver from turning in a given direction.

In some embodiments, the controller 28 may prompt the vehicle brake control system 72 and/or the powertrain control system 74 to adjust the speed $v_1$ of the vehicle 14 when the object 15 detected in the operating environment 24 of the vehicle 14 is determined to be in the travel path of the trailer 12. For example, in some embodiments, the controller 28 may prompt the powertrain control system 74 and the vehicle brake control system 72 to work in unison to reduce the speed $v_1$ of the vehicle 14. It is contemplated that, in some embodiments, the controller 28 may prompt execution of a sideswipe avoidance measure that stops the vehicle 14.

In some embodiments, the controller 28 may prompt various vehicle systems (e.g., the power assist steering system 62, the vehicle brake control system 72, the powertrain control system 74, etc.) to control movement of the vehicle 14 such that the predicted sideswipe event is avoided or mitigated. For example, in some embodiments, the controller 28 may prompt the vehicle systems to reduce the steering angle δ of the vehicle 14 such that dynamic turning radius of the vehicle 14 and/or the dynamic trailer turning radius $r_t$ increases. The controller 28 may direct the vehicle systems to reduce the steering angle δ such that the travel path of the trailer 12 no longer overlaps with the position of the object 15. For example, in some embodiments, the controller 28 may direct the vehicle systems to reduce the steering angle δ of the vehicle 14 such that the inner trailer boundary line 90 no longer intersects the virtual circle 92.

Figure 7:
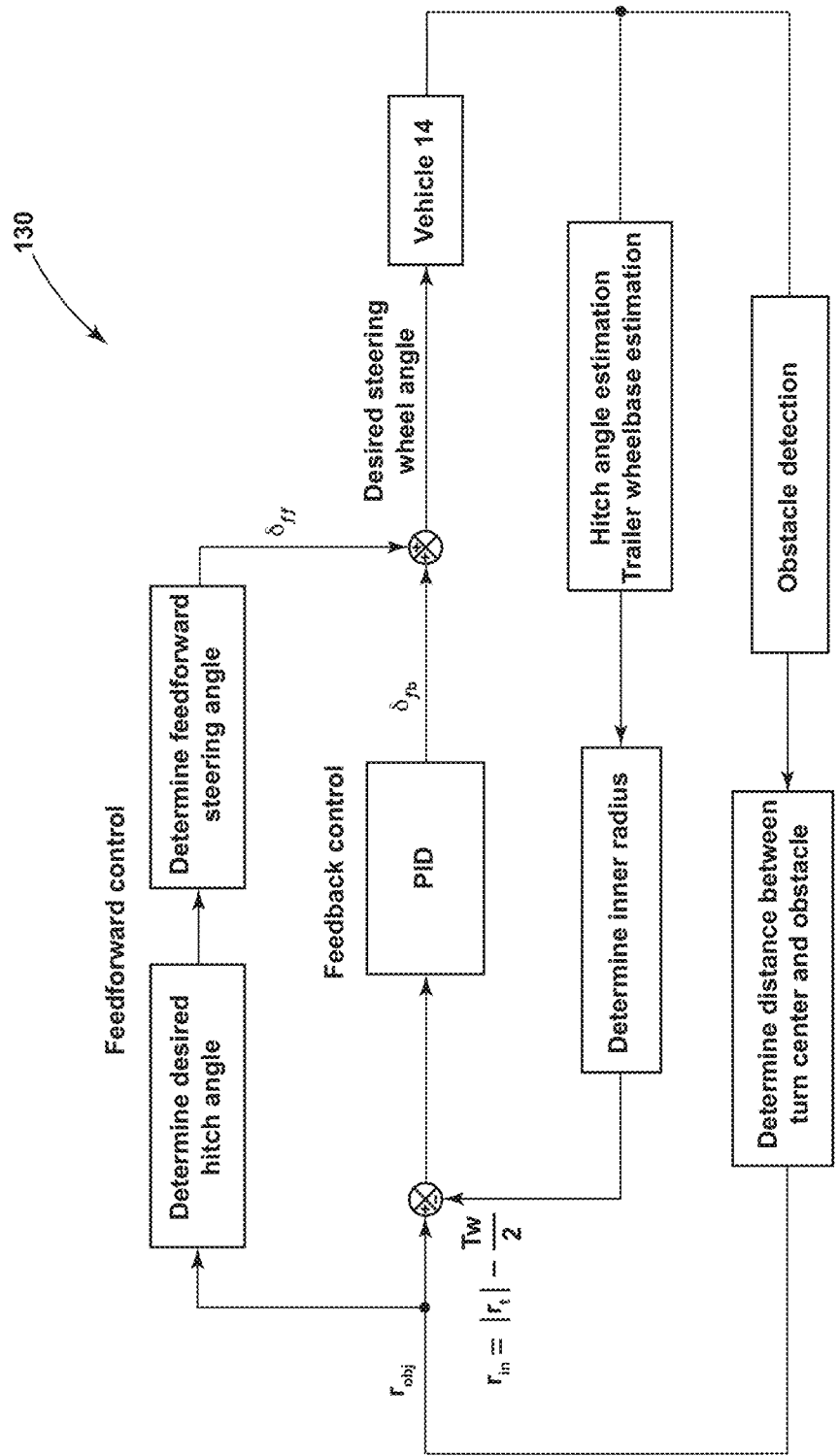
FIG. 7 is a schematic block diagram illustrating the flow of logic in a controller for achieving a desired steering wheel angle during operating of the trailer sideswipe avoidance system, according to one embodiment.

Referring now to FIG. 7, in some embodiments, the trailer sideswipe avoidance system 10 may use the following logic to adjust the steering angle δ of the vehicle 14 to avoid a sideswipe event as desired. First, a desired hitch angle $\gamma_d$ may be determined with the length L between the hitch point and the rear axle of the vehicle 14, the trailer wheel base D, and the distance $r_{obj}$ of the object 15 from the trailer turning center O. Note that:

$$r_{obj} = \frac{L + D\cos\gamma_d}{\sin\gamma_d}$$

Accordingly, by rearranging the above equation and applying $\sin^2\gamma_d + \cos^2\gamma_d = 1$ $r_{obj} \sin\gamma_d = L + D\cos\gamma_d$ As such, $$\gamma_d = \sin^{-1}\frac{Lr_{obj} + D\sqrt{D^2 - L^2 + r_{obj}^2}}{D^2 + r_{obj}^2}$$

Next, a feedforward steering angle $\delta_{ff}$ may be determined with the length L between the hitch point and the rear axle of the vehicle 14, wheel base W of the vehicle 14, the trailer wheel base D, and the desired hitch angle $\gamma_d$, via the following equation:

$$\tan\delta_{ff} = -\frac{W\sin\gamma_d}{D + L\cos\gamma_d}$$

The feedforward steering angle $\delta_{ff}$ may be utilized by the controller 28 along with values from various calculations discussed above in the desired steering wheel angle routine 130 to determine a desired steering wheel angle $SW_d$ necessary to avoid sideswiping the object 15 with the trailer 12, as illustrated in FIG. 7. The vehicle 14 (via the sensor system 16) detects the object 15, and the distance $r_{obj}$ from the object 15 to the trailer turning center O is determined by the controller 28 in communication with the sensor system 16. The distance $r_{obj}$ from the object 15 to the trailer turning center O is then used to determine the desired hitch angle $\gamma_d$, which is, in turn, used to determine the feedforward steering angle $\delta_{ff}$, as discussed above. The feedforward steering angle $\delta_{ff}$ may then be used to determine the desired steering wheel angle $SW_d$, which may prompt the various vehicle systems, such as the power assist steering system 62, to control movement of the vehicle 14 to avoid a sideswipe event with the object 15. However, a variety of factors may contribute to error in the calculation of the feedforward steering angle $\delta_{ff}$, which, without correction, may impede consistent avoidance of sideswipe events. Accordingly, as the feedforward steering angle $\delta_{ff}$ is determined, a feedback steering angle $\theta_{fb}$ is also determined and added to the feedforward steering angle $\delta_{ff}$ value, and the resulting value ($\delta_{ff}+\delta_{fb}$) is used by the controller 28 to calculate the desired steering wheel angle $SW_d$.

Referring further to FIG. 7, in determining the feedback steering angle $\delta_{fb}$, the trailer sideswipe avoidance system 10 of the vehicle 14 estimates a hitch angle $\gamma$ and a trailer wheel base D, via the use of various vehicle systems and components, such as the sensor system 16 and data stored in memory 86 in the controller 28. The hitch angle estimation and the trailer wheel base estimation are then processed by the controller 28 to determine the dynamic trailer turning radius $r_t$. The controller 28 then takes the absolute value of the dynamic trailer turning radius $r_t$ and subtracts one half of the width $T_w$ of the trailer 12 from the absolute value of the dynamic trailer turning radius $r_t$ to obtain an inner radius $r_{in}$ value, generally equal to the distance from the trailer turning center O to the inner side 13 of the trailer 12 proximate point A of the inner trailer boundary line 90. The inner radius $r_{in}$ is then subtracted from the calculated distance $r_{obj}$ from the object 15 to the trailer turning center O. The resulting value ($r_{obj}-r_{in}$) is then input to a proportional integral derivative (PID) controller that is configured to calculate the feedback steering angle $\delta_{fb}$, which, when added to the feedforward steering angle $\delta_{ff}$, may generally and/or substantially eliminate error that may occur in the trailer sideswipe avoidance system 10. The summed feedforward steering angle $\delta_{ff}$ and feedback steering angle $\delta_{fb}$ are then used by the controller 28 to prompt the power assist steering system 62 and/or other vehicle systems to adjust the steering wheel angle to the desired steering wheel angle $SW_d$ and/or otherwise influence movement of the vehicle 14, such that the inner trailer boundary line 90 no longer intersects the virtual circle 92, and a sideswipe event may be avoided. It is contemplated that, in some embodiments, in which the vehicle 14 is equipped with a steering wheel 68 that is mechanically decoupled from the steering system (steer by wire), the trailer sideswipe avoidance system 10 may adjust the steering angle $\delta$ of the vehicle 14 without adjusting the steering wheel angle.

When the object 15 is in the travel path of the towed trailer 12, the steering angle $\delta$ of the vehicle 14 that, if implemented, would result in the towed trailer 12 avoiding a collision with the object 15 may be referred to as a collision avoidance steering angle of the vehicle 14. For example, the steering angle $\delta$ of the vehicle 14 that is achieved by moving the steering wheel 68 to the desired steering wheel angle $SW_d$, as described herein, may be the collision avoidance steering angle. In some examples, the collision avoidance steering angle may be the steering angle $\delta$ of the vehicle 14 that, if implemented, would result in the inner trailer boundary line 90 no longer intersecting the virtual circle 92. When the object 15 is in the operating environment 24 of the vehicle 14 and is outside of the travel path of the towed trailer 12, the steering angle $\delta$ of the vehicle 14 that, if implemented, would result in the towed trailer 12 colliding with the object 15 may be referred to as a collision inducing steering angle. For example, the collision inducing steering angle of the vehicle 14 may be the steering angle $\delta$ of the vehicle 14 that, if implemented, would result in the inner trailer boundary line 90 intersecting the virtual circle 92.

Referring now to FIGS. 2 and 9A-10C, in various embodiments, the controller 28 of the trailer sideswipe avoidance system 10 may prompt the visual display 82 to execute a sideswipe avoidance measure when the object 15 is determined to be in the travel path of the trailer 12. For example, in some embodiments, the controller 28 may prompt the visual display 82 to display a trailer collision alert zone 204 and a trailer collision avoidance zone 202 based on the determination that the object 15 is in the travel path of the towed trailer 12, as illustrated in FIGS. 9A-10C. In various embodiments, the trailer collision alert zone 204 generally represents a potentiality for a collision between the towed trailer 12 and the object 15, and the trailer collision avoidance zone 202 generally represents a potentiality for avoiding a collision between the towed trailer 12 and the object 15, as described further herein.

Figure 9A:
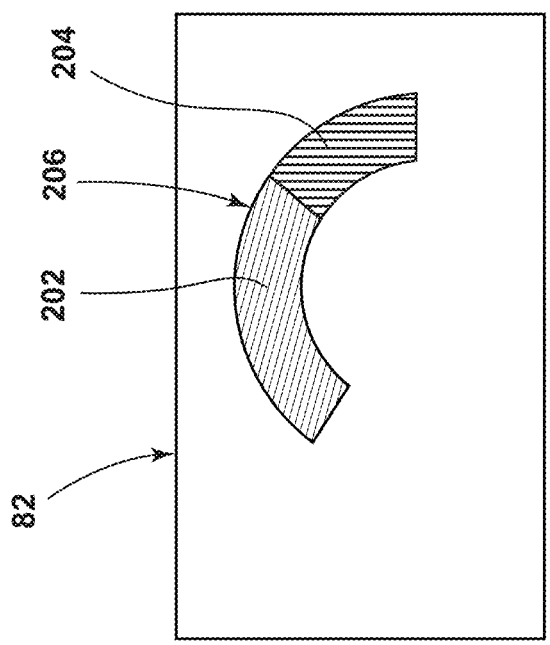
FIG. 9A is a front elevational view of the visual display, illustrating a trailer collision avoidance zone and a trailer collision alert zone displayed on the visual display, according to one embodiment.
Figure 9B:
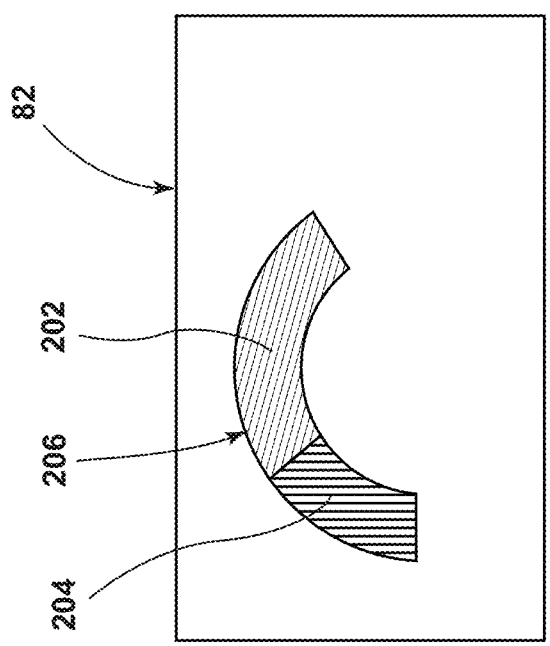
FIG. 9B is a front elevational view of the visual display, illustrating a trailer collision avoidance zone and a trailer collision alert zone displayed on the visual display, according to one embodiment.
Figure 10A:
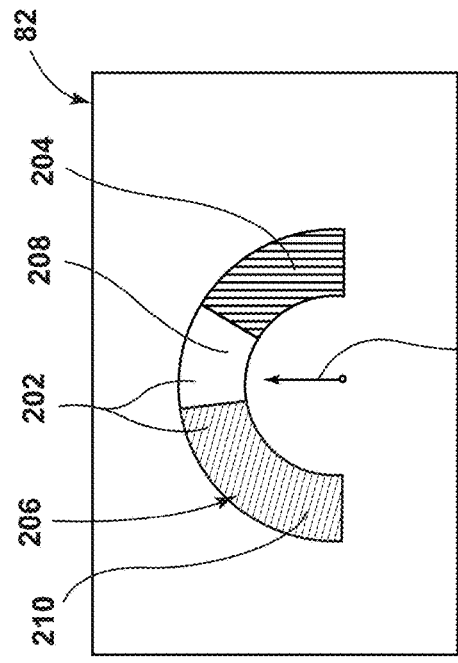
FIG. 10A is a front elevational view of the visual display, illustrating the trailer collision alert zone, first and second subzones that form the trailer collision avoidance zone, and a steering indicator that corresponds with the trailer collision alert zone displayed on the visual display, according to one embodiment.
Figure 10B:
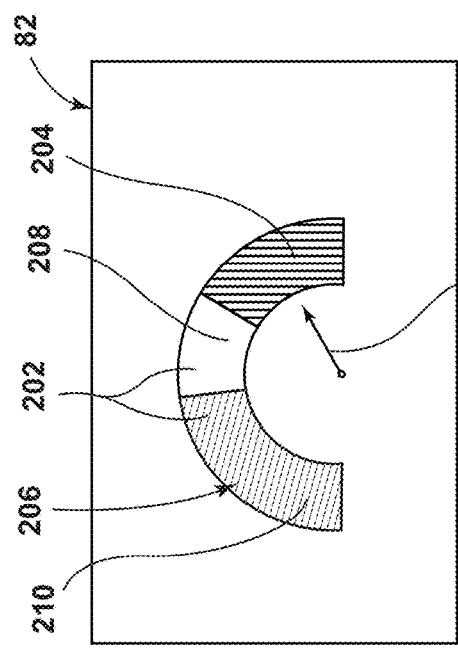
FIG. 10B is a front elevational view of the visual display, illustrating the trailer collision alert zone, the first and second subzones forming the trailer collision avoidance zone, and a steering indicator that corresponds with the first subzone displayed on the visual display, according to one embodiment.
Figure 10C:
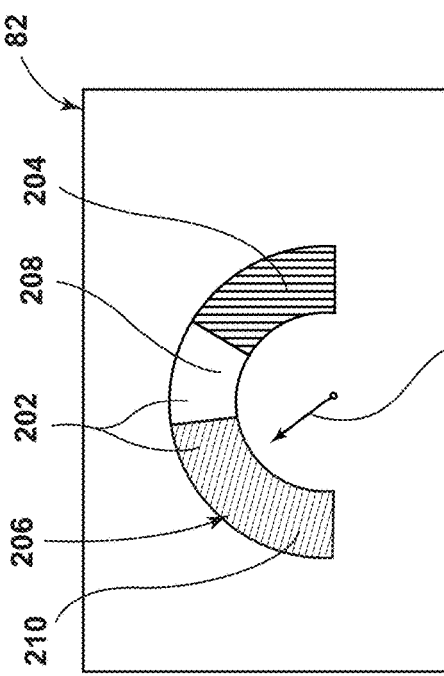
FIG. 10C is a front elevational view of the visual display, illustrating the trailer collision alert zone, the first and second subzones forming the trailer collision avoidance zone, and a steering indicator that corresponds with the second subzone displayed on the visual display, according to one embodiment.

In the embodiments illustrated in FIGS. 9A and 9B, the trailer collision alert zone 204 and the trailer collision avoidance zone 202 are displayed on the visual display 82 in the form of generally arcuate regions that abut each other and together generally form an arc 206 on the visual display 82. The trailer collision avoidance zone 202 and the trailer collision alert zone 204 may assume a variety of forms on the visual display 82, in various implementations. For example, in various embodiments, the trailer collision alert and avoidance zones 204, 202 may be one or more of a host of shapes and/or sizes, and may abut or be spaced apart from each other. In some implementations, the trailer collision alert zone 204 and/or the trailer collision avoidance zone 202 may comprise a single region on the visual display 82 or may include a plurality of subzones. For example, as illustrated in FIGS. 10A-10C, the trailer collision alert zone 204 is displayed as a single region on the visual display 82, and the trailer collision avoidance zone 202 includes a first subzone 208 and a second subzone 210 that is positioned further than the first subzone 208 from the trailer collision alert zone 204. In some embodiments, the trailer collision avoidance zone 202 may not be displayed as a delineated region on the visual display 82. In such embodiments, the portion of the visual display 82 that represents the trailer collision avoidance zone 202 may be inferred based on the position and/or shape of the trailer collision alert zone 204 on the visual display 82. In some embodiments, the trailer collision alert zone 204 may not be displayed as a delineated region on the visual display 82. In such embodiments, the portion of the visual display 82 that represents the trailer collision alert zone 204 may be inferred based on the position of the trailer collision avoidance zone 202.

Referring now to FIGS. 9A-10C, in some embodiments, the trailer collision alert zone 204 may have a different color than the trailer collision avoidance zone 202. For example, the trailer collision alert zone 204 may be red and the trailer collision avoidance zone 202 may be green. In some embodiments, the plurality of subzones of the trailer collision alert zone 204 and/or the trailer collision avoidance zone 202 may be different colors. For example, in the embodiment illustrated in FIGS. 10A-10C, each of the trailer collision alert zone 204, the first subzone 208 of the trailer collision avoidance zone 202, and the second subzone 210 of the trailer collision avoidance zone 202 are different colors. In an exemplary implementation, the trailer collision alert zone 204 may be red, the first subzone 208 of the trailer collision avoidance zone 202 may be yellow, and the second subzone 210 of the trailer collision avoidance zone 202 may be green.

Referring now to FIGS. 9A and 9B, when the controller 28 has determined that the object 15 is in the travel path of the towed trailer 12, the position of the trailer collision avoidance zone 202 on the visual display 82 relative to the position of the trailer collision alert zone 204 on the visual display 82 directionally corresponds with the collision avoidance steering angle of the vehicle 14 relative to the current steering angle δ of the vehicle 14. In other words, when the controller 28 has determined that the object 15 is in the travel path of the towed trailer 12, the difference between the current steering angle δ of the vehicle 14 and the collision avoidance steering angle of the vehicle 14 may directionally correspond with the difference between the position of the trailer collision alert zone 204 on the visual display 82 and the position of the trailer collision avoidance zone 202 on the visual display 82. For example, if the collision avoidance steering angle is left of the current steering angle δ (i.e., if counter-clockwise rotation of the steering wheel 68 would achieve the collision avoidance steering angle), then the trailer collision avoidance zone 202 is positioned to the left of the trailer collision alert zone 204 on the visual display 82. Further, if the collision avoidance steering angle is right of the current steering angle δ (i.e., if clockwise rotation of the steering wheel 68 would achieve the collision avoidance steering angle), then the trailer collision avoidance zone 202 is positioned to the right of the trailer collision alert zone 204 on the visual display 82.

In some embodiments, the visual display 82 may be configured to display the trailer collision alert zone 204 and the trailer collision avoidance zone 202 when the object 15 is outside of the travel path of the towed trailer 12. For example, in some embodiments, the controller 28 may prompt the visual display 82 to display the trailer collision avoidance zone 202 and the trailer collision alert zone 204 in response to a determination that the object 15 initially is in the travel path of the towed trailer 12. In response, the driver of the vehicle 14 may adjust the current steering angle δ of the vehicle 14 to the collision avoidance steering angle, such that the object 15 is outside of the travel path of the towed trailer 12. Subsequently, the visual display 82 may continue displaying the trailer collision avoidance and alert zones 202, 204 to indicate to the driver that a reversion in steering angle δ may cause the object 15 to reenter the travel path of the towed trailer 12.

In some embodiments, the visual display 82 may display the trailer collision avoidance zone 202 and/or the trailer collision alert zone 204 based on one or more of a variety of factors other than a determination that the object 15 is in the travel path of the towed trailer 12. For example, the visual display 82 may be configured to display the trailer collision avoidance zone 202 and/or the trailer collision alert zone 204 when the vehicle 14 is turning, the object 15 is detected within operating environment 24 of the vehicle 14, the object 15 is less than a threshold value from being within the travel path of the towed trailer 12, and/or a combination thereof. It is contemplated that the visual display 82 may be configured to display the trailer collision avoidance zone 202 and/or the trailer collision alert zone 204 based on a variety of other factors, additionally or alternatively.

In various embodiments, when the object 15 is outside of the travel path of the towed trailer 12, the position of the trailer collision avoidance zone 202 on the visual display 82 relative to the position of the trailer collision alert zone 204 on the visual display 82 directionally corresponds with the current steering angle δ of the vehicle 14 relative to the collision inducing steering angle of the vehicle 14. In other words, if the controller 28 has determined that the object 15 is outside the travel path of the towed trailer 12, the difference between the current steering angle δ of the vehicle 14 and the collision inducing steering angle of the vehicle 14 may directionally correspond with the difference between the position of the trailer collision avoidance zone 202 on the visual display 82 and the position of the trailer collision alert zone 204 on the visual display 82. For example, if the collision inducing steering angle is left of the current steering angle δ (i.e., if counter-clockwise rotation of the steering wheel 68 would achieve the collision inducing steering angle), then the trailer collision alert zone 204 is positioned to the left of the trailer collision avoidance zone 202 on the visual display 82. Further, if the collision inducing steering angle is right of the current steering angle δ (i.e., if clockwise rotation of the steering wheel 68 would achieve the collision inducing steering angle), then the trailer collision alert zone 204 is positioned to the right of the trailer collision avoidance zone 202 on the visual display 82.

In various implementations, the position and/or size of the trailer collision alert zone 204 and/or the trailer collision avoidance zone 202 displayed on the visual display 82 may vary. The position and/or size of the trailer collision alert zone 204 and/or the trailer collision avoidance zone 202 may vary based on a variety of factors that may include, but is not limited to, the steering angle δ of the vehicle 14, the collision avoidance steering angle, the collision inducing steering angle, the position of the object 15, the speed $v_1$ of the vehicle 14, the time until sideswiping $t_{ss}$, and/or a combination thereof.

Referring now to FIGS. 10A-10C, in some embodiments, the controller 28 may be configured to prompt the visual display 82 to display a steering indicator 212. The steering indicator 212 may represent the current steering angle δ of the vehicle 14. For example, in some embodiments, the displayed steering indicator 212 may change positions on the visual display 82 from right to left and/or in a counter-clockwise direction, as the steering angle δ of the vehicle 14 moves to the left (i.e., as the steering wheel 68 is rotated counter-clockwise). Further, the displayed steering indicator 212 may change positions on the visual display 82 from left to right and/or in a clockwise direction, as the steering angle δ of the vehicle 14 moves to the right (i.e., as the steering wheel 68 is rotated clockwise).

In the embodiment illustrated in FIGS. 10A-10C, the steering indicator 212 is displayed as an arrow 214 on the visual display 82. In FIG. 10A, the arrow 214 points generally toward the right, which represents the steering angle δ of the vehicle 14 as the vehicle 14 turns to the right. In FIG. 10B, the arrow 214 points generally upward, which represents that the steering angle δ of the vehicle 14 has been adjusted, such that the vehicle 14 is heading substantially straight-forward. In FIG. 10C, the arrow 214 points generally left, which represents that the steering angle δ of the vehicle 14 has been adjusted, such that the vehicle 14 is turning to the left. It is contemplated that, in some embodiments, the steering indicator 212 may inexactly represent the current steering angle δ of the vehicle 14. For example, while the vehicle 14 may be operable to achieve steering angles δ of 30° both left and right of center, the steering indicator 212 may rotate more or less than 30° on the visual display 82. Further, while the steering indicator 212 is displayed as an arrow 214 in the embodiments illustrated in FIGS. 10A-10C, in various embodiments, the steering indicator 212 may assume a variety of forms on the visual display 82. In some examples, the steering indicator 212 may be displayed as a gauge needle. In some examples, the steering indicator 212 be displayed as a highlighted portion of the outline of the trailer collision avoidance zone 202 and/or the trailer collision alert zone 204 depending on the steering angle δ of the vehicle 14. Various embodiments are contemplated.

Referring still to FIGS. 10A-10C, in various embodiments, the steering indicator 212 may correspond with the trailer collision alert zone 204 or the trailer collision avoidance zone 202 based on whether the object 15 is in the travel path of the towed trailer 12. For example, the steering indicator 212 may correspond with the trailer collision alert zone 204 when the controller 28 determines that the object 15 is in the travel path of the towed trailer 12, and the steering indicator 212 may correspond with the trailer collision avoidance zone 202 when the controller 28 determines that the object 15 is outside of the travel path of the towed trailer 12. In the embodiment illustrated in FIG. 10A, the steering indicator 212 corresponds with the trailer collision alert zone 204 via the arrow 214 pointing toward the trailer collision alert zone 204. Similarly, in the embodiments illustrated in FIGS. 10B and 10C, the steering indicator 212 corresponds with the trailer collision avoidance zone 202 via the arrow 214 pointing toward the trailer collision avoidance zone 202.

It is contemplated that various types of steering indicators 212 displayed on the visual display 82 may correspond with the trailer collision avoidance and alert zones 202, 204 in a variety of manners that would indicate to a driver which of the zones the steering indicator 212 corresponds with. For example, in an embodiment where the steering indicator 212 is displayed as a highlighted portion of the outline of the arc 206 formed by the trailer collision avoidance and alert zones 202, 204, the steering indicator 212 may correspond with the trailer collision avoidance zone 202 by highlighting the portion of the arc 206 formed by the trailer collision avoidance zone 202 when the object 15 is not in the travel path of the towed trailer 12. Further, the steering indicator 212 may correspond with the trailer collision alert zone 204 by highlighting the portion of the arc 206 formed by the trailer collision alert zone 204 when the object 15 is in the travel path of the towed trailer 12.

Referring now to FIGS. 2 and 11, in various embodiments, the controller 28 of the trailer sideswipe avoidance system 10 may prompt the plurality of haptic devices 200 coupled to the steering wheel 68 to execute a sideswipe avoidance measure when the object 15 is determined to be in the travel path of the trailer 12. In some embodiments, the controller 28 may prompt the plurality of haptic devices 200 to activate sequentially based on the determination that the object 15 is in the travel path of the towed trailer 12, such that haptic output travels along the steering wheel 68 in at least one of a clockwise direction 218 and a counter-clockwise direction 216. In various implementations, the haptic output travels in the counter-clockwise direction 216 along the steering wheel 68 when the collision avoidance steering angle is achievable via counter-clockwise rotation of the steering wheel 68. Further, the haptic output produced by sequential activation of the plurality of haptic devices 200 may travel in the clockwise direction 218 along the steering wheel 68 when the collision avoidance steering angle is achievable via clockwise rotation of the steering wheel 68.

In further reference to FIGS. 2 and 11, the plurality of haptic devices 200 coupled to the steering wheel 68 may be sequentially activated in a variety of manners to produce haptic output that travels along the steering wheel 68 in at least one of the clockwise direction 218 and the counter-clockwise direction 216. As illustrated in FIG. 11, the plurality of haptic devices 200 include first, second, and third haptic devices 200A, 200B, 200C. The second haptic device 200B is adjacent to the first haptic device 200A at a position on the steering wheel 68 that is clockwise from the position of the first haptic device 200A on the steering wheel 68. The third haptic device 200C is positioned adjacent to the second haptic device 200B at a position on the steering wheel 68 that is clockwise from the position of the second haptic device 200B on the steering wheel 68. As further illustrated in FIG. 11, the plurality of haptic devices 200 includes fourth, fifth, and sixth haptic devices 200D, 200E, 200F. In the illustrated embodiment, the first, second and third haptic devices 200A, 200B, 200C are located on the right side of the steering wheel 68 and the fourth, fifth, and sixth haptic devices 200D, 200E, 200F are located on the left side of the steering wheel 68. The fifth haptic device 200E is adjacent to the fourth haptic device 200D at a position on the steering wheel 68 that is clockwise from the position of the fourth haptic device 200D on the steering wheel 68. The sixth haptic device 200F is positioned adjacent to the fifth haptic device 200E at a position on the steering wheel 68 that is clockwise from the position of the fifth haptic device 200E on the steering wheel 68.

In one exemplary embodiment, the plurality of haptic devices 200 coupled to the steering wheel 68 may be activated sequentially to produce haptic output that travels along the steering wheel 68 in a clockwise direction 218 by activating the first, second, and third haptic devices 200A, 200B, 200C successively and then further activating the haptic device positioned adjacent to and clockwise from the third haptic device 200C and so on, such that a generally contiguous chain of haptic output that snakes along the steering wheel 68 in a clockwise direction 218 results. In another exemplary embodiment, the plurality of haptic devices 200 coupled to the steering wheel 68 may be activated sequentially to produce haptic output that travels along the steering wheel 68 in a clockwise direction 218 by activating the first and fourth haptic devices 200A, 200D simultaneously, followed by the second and fifth haptic 200B, 200E devices simultaneously, followed by the third and sixth haptic devices 200C, 200F simultaneously, and so on, such that a plurality of chains of haptic output that snake along the steering wheel 68 in a clockwise direction 218 simultaneously results. It is to be understood that the plurality of haptic devices 200 may produce a haptic output that travels along the steering wheel 68 in a counter-clockwise direction 216 by reversing the above-described activation sequences. Further, it is contemplated that the plurality of haptic devices 200 may be configured to produce a haptic output that travels along the steering wheel 68 in at least one of the clockwise direction 218 and the counter-clockwise direction 216 via a variety of activation sequences not specifically described herein.

Referring now to FIG. 2, the controller 28 of the trailer sideswipe avoidance system 10 may prompt one or more vehicle systems to execute a sideswipe avoidance measure based on time until sideswiping $t_{ss}$. In some embodiments, a sideswipe avoidance measure may be executed when the time until sideswiping $t_{ss}$ is less than a threshold time value. In various embodiments, the threshold time value may be a predetermined value. In some examples, the threshold time value may be a fixed predetermined value that is stored in memory 86. Further, in some examples, the threshold time value may vary based on certain conditions in accordance with predetermined logic of the controller 28. For example, in some embodiments, the threshold time value may depend on at least one of a variety of conditions that may include, but is not limited to, vehicle speed $v_1$, trailer 12 dimensions, steering angle δ, size of detected object 15, object 15 type classifications, and/or a combination thereof.

Referring further to FIG. 2, in some embodiments, the controller 28 of the trailer sideswipe avoidance system 10 may prompt one or more vehicle systems to execute a first sideswipe avoidance measure when the time until sideswiping $t_{ss}$ is less than a first predetermined threshold time value and prompt one or more vehicle systems to execute a second sideswipe avoidance measure when the time until sideswiping $t_{ss}$ is less than a second predetermined threshold time value, wherein the first predetermined threshold time value is greater than the second predetermined threshold time value. For example, in some embodiments, the controller 28 of the trailer sideswipe avoidance system 10 may prompt the visual display 82 to display the trailer collision avoidance and alert zones 202, 204 and/or the plurality of haptic devices 200 to activate sequentially when the time until sideswiping $t_{ss}$ is less than 3 seconds and prompt the power assist steering system 62 to adjust the steering wheel angle when the time until sideswiping $t_{ss}$ is less than 1.5 seconds. It is contemplated that, in some embodiments, the controller 28 of the trailer sideswipe avoidance system 10 may prompt one or more vehicle systems to execute a plurality of sideswipe avoidance measures based on the time until sideswiping $t_{ss}$ coinciding with a plurality of threshold time values.

Figure 12:
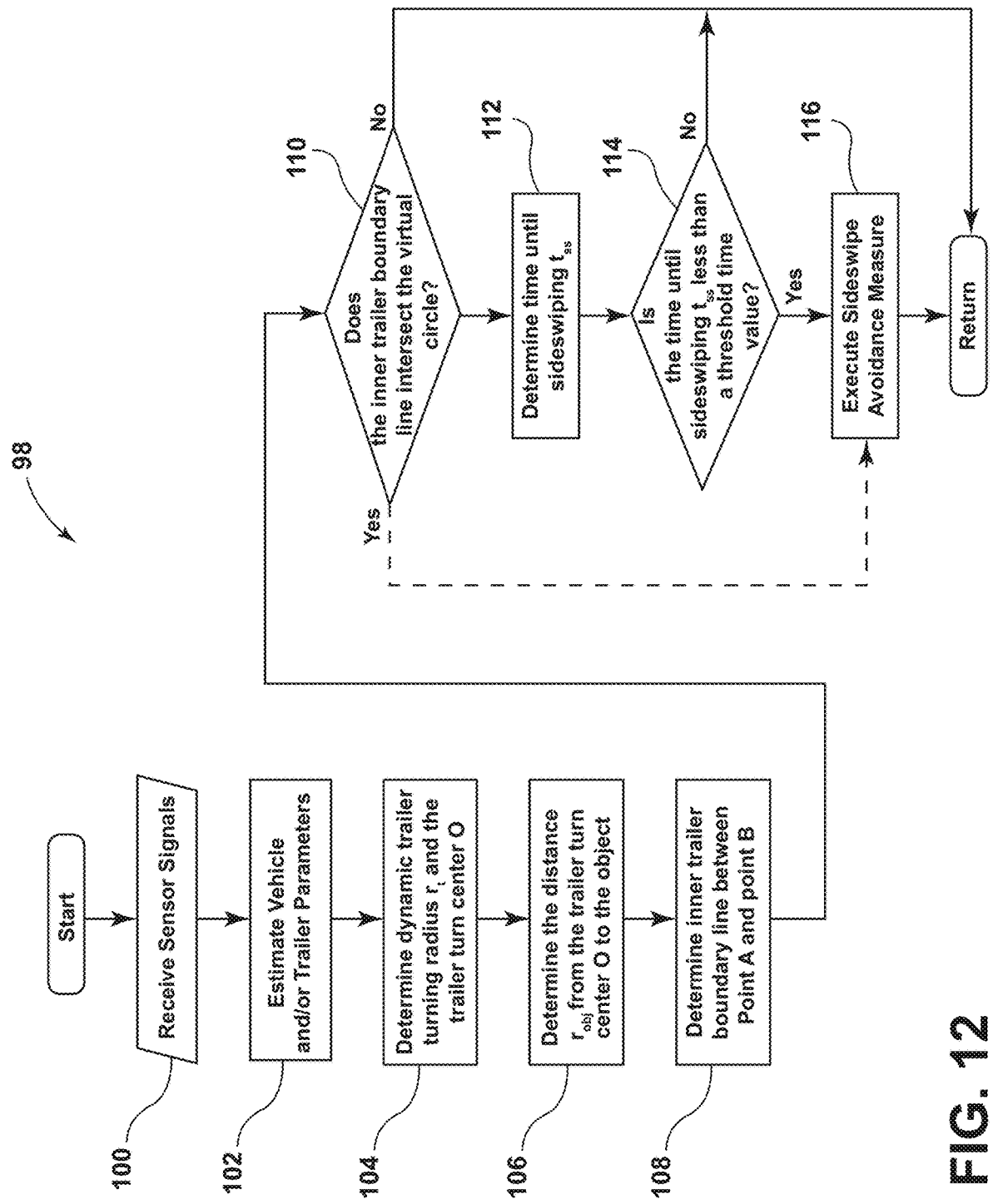
FIG. 12 is a flow diagram illustrating a trailer sideswipe avoidance routine, according to one embodiment.

Referring now to FIG. 12, an embodiment of the trailer sideswipe avoidance routine 98 for use in the trailer sideswipe avoidance system 10 is illustrated. In the illustrated embodiment, the trailer sideswipe avoidance routine 98 begins in step 100 by receiving signals from the sensor system 16 of the vehicle 14. These signals may pertain to parameters and conditions relating to the vehicle 14, the trailer 12, and/or the object 15.

At step 102 the received signals may be utilized to estimate various vehicle 14 and/or trailer 12 parameters. For example, in various examples, the received signals may be used to estimate the hitch angle γ, the trailer wheel base D, and the trailer width $T_w$. It is contemplated that in some examples, other vehicle 14 and/or trailer 12 parameters may be estimated additionally.

At step 104, the trailer sideswipe avoidance system 10 may determine the dynamic trailer turning radius $r_t$ and the trailer turning center O. Next, at step 106, the trailer sideswipe avoidance system 10 may determine the distance $r_{obj}$ from the trailer turning center O to the object 15. At step 108, the trailer sideswipe avoidance system 10 may determine the position of the inner trailer boundary line 90 extending between point A and point B. In various examples, the position of the inner trailer boundary line 90 is obtained by first determining point A and point B.

Next, at step 110, the trailer sideswipe avoidance system 10 determines whether the inner trailer boundary line 90 intersects the virtual circle 92 having a radius of $r_{obj}$ (the distance of the detected object 15 from the trailer turning center O) and center ($x_c$, $y_c$) (the coordinates of the trailer turning center O). If the inner trailer boundary line 90 does not intersect the virtual circle 92, then the trailer sideswipe avoidance routine 98 may conclude or, in some embodiments, return to the beginning and start again. If the inner trailer boundary line 90 does intersect the virtual circle 92, then the trailer sideswipe avoidance routine 98 may continue to step 112. However, as is illustrated by the dashed arrow in FIG. 12, in some examples, the trailer sideswipe avoidance routine 98 may proceed directly to step 116 upon a determination that the inner trailer boundary line 90 does intersect the virtual circle 92, wherein the controller 28 of the trailer sideswipe avoidance system 10 is configured to prompt one or more vehicle systems to execute the sideswipe avoidance measure. In various embodiments, the trailer sideswipe avoidance routine 98 proceeding directly to step 116 may be in addition to the trailer sideswipe avoidance routine 98 proceeding to step 112 or as an alternative.

At step 112, the controller 28 of the trailer sideswipe avoidance system 10 is configured to determine the time until sideswiping $t_{ss}$ of the object 15 with the trailer 12. Next, at step 114, the trailer sideswipe avoidance system 10 determines whether the time until sideswiping $t_{ss}$ is less than the threshold time value. If the time until sideswiping $t_{ss}$ is not less than a threshold time value, the trailer sideswipe avoidance routine 98 may return to the beginning of the routine and start again. If the time until sideswiping $t_{ss}$ is less than a threshold time value, the trailer sideswipe avoidance routine 98 may proceed to step 116, wherein the controller 28 of the trailer sideswipe avoidance system 10 is configured to prompt one or more vehicle systems to execute the sideswipe avoidance measure.

Referring now to FIG. 13, a method 150 of operating the trailer sideswipe avoidance system 10 is illustrated. The method 150 includes the step 152 of operating the vehicle 14. The step 152 of operating the vehicle may include driving the vehicle 14. Further, it may include driving the vehicle 14 in the generally forward direction while towing the trailer 12. The step 152 of operating the vehicle 14 may further include turning the vehicle 14 while towing the trailer 12 in the forward direction.

In various embodiments, the method 150 of operating the trailer sideswipe avoidance system 10 may further include the step 154 of determining vehicle 14 and/or trailer 12 conditions. The step 154 may encompass determining a variety of vehicle 14 and/or trailer 12 conditions and/or parameters. For example, in some embodiments, the step 154 may include estimating and/or determining at least one of a host of vehicle and/or trailer parameters and/or conditions that may include, but is not limited to, the hitch angle γ, the speed of the trailer $v_2$, the trailer wheel base D, and the trailer width $T_w$, the dynamic trailer turning radius $r_t$, the trailer turning center O, and/or the position of the inner trailer boundary line 90.

In various embodiments, the method 150 of operating the trailer sideswipe avoidance system 10 may further include the step 156 of detecting objects 15 in the operating environment 24 of the vehicle 14. In some embodiments, the sensor system 16 may be configured to detect the object 15. In some embodiments, the virtual sensor system 18 may detect the object 15. The position of the object 15 detected may be determined by the controller 28 in communication with the sensor system 16.

The method 150 of operating the trailer sideswipe avoidance system 10 may further include the step 158 of determining a relationship between the object 15, the vehicle 14, and/or the trailer 12. For example, in some embodiments, the step 158 may include determining the distance $r_{obj}$ from the object 15 to the trailer turning center O. Further, in some embodiments, the step 158 may include determining that the object 15 is in the travel path of the towed trailer 12. For example, the step 158 may include determining whether the inner trailer boundary line 90 intersects the virtual circle 92. In various embodiments, the step 158 may include determining the time until sideswiping $t_{ss}$ of the object 15 with the trailer 12. As discussed above, in various embodiments, the time until sideswiping $t_{ss}$ may be based on the speed of the trailer $v_2$, the dynamic trailer turning radius $r_t$, and the angle θ between the line extending from the trailer turning center O to the object 15 and the line extending from the trailer turning center O to the intersection point M of the inner trailer boundary line 90 and the virtual circle 92. This angle θ is described above as being defined between lines running from the trailer turning center O ($x_c$, $y_c$) to the intersection point M ($x_M$, $y_M$) and the trailer turning center O ($x_c$, $y_c$) to the position of the object 15 ($x_{obj}$, $y_{obj}$). In some embodiments, the step 158 may include the controller 28 of the trailer sideswipe avoidance system 10 comparing the time until sideswiping $t_{ss}$ to the threshold time value and/or a plurality of threshold time values. As discussed above, the one or more threshold time values may be predetermined.

The method 150 of operating the trailer sideswipe avoidance system 10 may further include the step 160 of displaying the trailer collision alert zone 204 and the trailer collision avoidance zone 202 on the visual display 82. In various embodiments, the position of the trailer collision avoidance zone 202 on the visual display 82 relative to the position of the trailer collision alert zone 204 on the visual display 82 directionally corresponds with the collision avoidance steering angle of the vehicle relative to the current steering angle δ of the vehicle. In some implementations, the step 160 of displaying the trailer collision alert and avoidance zones 204, 202 on the visual display 82 may be executed based on and/or in response to a determination that the object 15 is in the travel path of the towed trailer 12. The step 160 may be executed based on and/or in response to various conditions, in some embodiments, as described above herein.

The method 150 of operating the trailer sideswipe avoidance system 10 may further include the step 162 of modifying the position of at least one of the trailer collision alert zone 204 and the trailer collision avoidance zone 202 on the visual display 82. In some implementations, the position of at least one of the trailer collision alert zone 204 and the trailer collision avoidance zone 202 on the visual display 82 may be modified dynamically based on at least one of a host of factors that may include, but is not limited to, the steering angle δ of the vehicle 14, the collision avoidance steering angle, the collision inducing steering angle, the position of the object 15, the speed $v_1$ of the vehicle 14, the time until sideswiping $t_{ss}$, and/or a combination thereof. For example, the trailer collision alert zone 204 may initially be positioned on the left side of the arc 206 formed by the trailer collision alert and avoidance zones 204, 202 on the visual display 82, as illustrated in FIG. 9A, due to an object 15 being detected in the travel path of the towed trailer 12 as the vehicle 14 turns left. Then, when the vehicle 14 subsequently makes a right turn and another object 15 is detected in the travel path of the towed trailer 12, the position of the trailer collision alert zone 204 may be modified, such that the trailer collision alert zone 204 is positioned on the right side of the arc 206 formed by the trailer collision alert and avoidances zones 204, 202 on the visual display 82, as illustrated in FIG. 9B. In various embodiments, the position of at least one of the trailer collision alert zone 204 and the trailer collision avoidance zone 202 on the visual display 82 may be modified dynamically along the arc 206 formed by the trailer collision avoidance and alert zones 202, 204 on the visual display 82.

The method 150 of operating the trailer sideswipe avoidance system 10 may further include the step 164 of displaying the steering indicator 212 on the visual display 82. In various embodiments, the steering indicator 212 may represent the current steering angle δ of the vehicle 14. As discussed above, while the steering indicator 212 is displayed as an arrow 214 in the embodiments illustrated in FIGS. 10A-10C, in various embodiments, the steering indicator 212 may assume a variety of forms on the visual display 82. In some examples, the steering indicator 212 may be displayed as a gauge needle. In some examples, the steering indicator 212 may be displayed as a highlighted outline of the trailer collision avoidance zone 202 and/or the trailer collision alert zone 204 depending on the steering angle δ of the vehicle 14. Various embodiments are contemplated.

The method 150 of operating the trailer sideswipe avoidance system 10 may further include the step 166 of steering the vehicle 14 to achieve the collision avoidance steering angle. In various embodiments, the step 166 may be performed by a driver of the vehicle 14 via rotation of the steering wheel 68 that modifies the steering angle δ of the vehicle 14, such that the travel path of the towed trailer 12 no longer intersects with the object 15.

The method 150 of operating the trailer sideswipe avoidance system 10 may further include the step 168 of modifying the position of the steering indicator 212 on the visual display 82. In various embodiments, the step 168 may include modifying the position of the steering indicator 212 on the visual display 82 from a first position, wherein the steering indicator 212 corresponds with the trailer collision alert zone 204, to a second position, wherein the steering indicator 212 corresponds with the trailer collision avoidance zone 202. In some embodiments, the step 168 may be executed based on, in response to, and/or in conjunction with step 166 being executed. In other words, the position of steering indicator 212 on the visual display 82 may be modified from the first position, wherein the steering indicator 212 corresponds with the trailer collision avoidance zone 202, as illustrated in FIG. 10A, to the second position, wherein the steering indicator 212 corresponds with the trailer collision avoidance zone 202, as illustrated in FIG. 10B, as a driver steers the vehicle 14 to achieve the collision avoidance steering angle.

The method 150 of operating the trailer sideswipe avoidance system 10 may further include the step 170 of activating the plurality of haptic devices 200. As discussed above, the plurality of haptic devices 200 may be coupled to the steering wheel 68 of the vehicle 14. In some implementations, the step 170 may include activating the plurality of haptic devices 200 coupled to the steering wheel 68 sequentially, such that haptic output travels along the steering wheel 68 in at least one of a clockwise direction 218 and a counter-clockwise direction 216. As described above herein, the haptic output may travel in the counter-clockwise direction 216 along the steering wheel 68 when the collision avoidance steering angle is achievable via counter-clockwise rotation of the steering wheel 68, and the haptic output produced by sequential activation of the plurality of haptic devices 200 may travel in the clockwise direction 218 along the steering wheel 68 when the collision avoidance steering angle is achievable via clockwise rotation of the steering wheel 68. In some embodiments, the haptic output travels in a counter-clockwise direction 216 and the trailer collision avoidance zone 202 is positioned left of the trailer collision alert zone 204 on the visual display 82. In some embodiments, the haptic output travels in a clockwise direction 218 and the trailer collision avoidance zone 202 is positioned right of the trailer collision alert zone 204 of the visual display 82.

The present disclosure may provide a variety of advantages. For example, operation of the trailer sideswipe avoidance system 10 may enable the controller 28 to prompt the visual display 82 to display the trailer collision alert zone 204, the trailer collision avoidance zone 202, and the steering indicator 212, such that a driver of the vehicle 14 may have a visual of what the current steering angle δ of the vehicle 14 is and what steering angle δ is necessary to avoid having the towed trailer 12 collide with an object 15 in the operating environment 24 of the vehicle 14. Further, operation of the trailer sideswipe avoidance system 10 may enable the controller 28 to prompt the plurality of haptic devices 200 to produce a haptic output that travels along the steering wheel 68 in a direction that corresponds with and indicates to the driver of the vehicle 14 the direction the steering wheel 68 should be rotated to avoid a collision between the towed trailer 12 and the object 15.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trailer sideswipe avoidance system for a vehicle towing a trailer, comprising:
    a sensor system configured to detect one or more objects in an operating environment of the vehicle;
    a controller that processes information received from the sensor system to determine whether an object detected in the operating environment of the vehicle is in a travel path of the towed trailer as the vehicle turns; and
    a visual display that displays a trailer collision alert zone and a trailer collision avoidance zone at respective positions on the visual display, wherein the position of the trailer collision avoidance zone on the visual display relative to the position of the trailer collision alert zone on the visual display directionally corresponds with a collision avoidance steering angle of the vehicle relative to a current steering angle of the vehicle when the controller determines that the object is in the travel path of the towed trailer, and wherein the position of the trailer collision avoidance zone on the visual display relative to the position of the trailer collision alert zone on the visual display directionally corresponds with the current steering angle of the vehicle relative to a collision inducing steering angle of the vehicle when the controller determines that the object is outside of the travel path of the towed trailer.

2. The trailer sideswipe avoidance system of claim 1, wherein the trailer collision alert zone is a different color than the trailer collision avoidance zone.

3. The trailer sideswipe avoidance system of claim 1, wherein the trailer collision avoidance zone includes a first subzone and a second subzone, wherein the second subzone is positioned further than the first subzone from the trailer collision alert zone, and wherein each of the first subzone, the second subzone, and the trailer collision alert zone are different colors.

4. The trailer sideswipe avoidance system of claim 1, wherein the trailer collision avoidance zone and the trailer collision alert zone generally form an arc on the visual display.

5. The trailer sideswipe avoidance system of claim 4, wherein the controller is further configured to prompt the visual display to display a steering indicator that represents the current steering angle of the vehicle, wherein the steering indicator corresponds with the trailer collision alert zone when the controller determines that the object is in the travel path of the towed trailer.

6. The trailer sideswipe avoidance system of claim 5, wherein the steering indicator corresponds with the trailer collision avoidance zone when the controller determines that the object is outside of the travel path of the towed trailer.

7. A method of operating a trailer sideswipe avoidance system for a vehicle towing a trailer, comprising the steps of:
    detecting an object in an operating environment of the vehicle;
    determining the object is in a travel path of the towed trailer;
    displaying a trailer collision alert zone and a trailer collision avoidance zone at respective positions on a visual display, wherein the position of the trailer collision avoidance zone on the visual display relative to the position of the trailer collision alert zone on the visual display directionally corresponds with a collision avoidance steering angle of the vehicle relative to a current steering angle of the vehicle;
    displaying a steering indicator on the visual display, wherein the steering indicator represents the current steering angle of the vehicle;
    steering the vehicle to achieve the collision avoidance steering angle; and
    modifying the position of the steering indicator on the visual display from a first position, wherein the steering indicator corresponds with the trailer collision alert zone, to a second position, wherein the steering indicator corresponds with the trailer collision avoidance zone.

8. The method of claim 7, further comprising the step of:
    modifying the position of the trailer collision alert zone on the visual display based on information from a sensor system of the vehicle.

9. The method of claim 7, wherein the trailer collision alert zone is a different color than the trailer collision avoidance zone.

10. The method of claim 7, wherein the trailer collision avoidance zone includes a first subzone and a second subzone, wherein the second subzone is positioned further than the first subzone from the trailer collision alert zone, and wherein each of the first subzone, the second subzone, and the trailer collision alert zone are different colors.

11. The trailer sideswipe avoidance system of claim 7, wherein the trailer collision avoidance zone and the trailer collision alert zone generally form an arc on the visual display.

* * * * *